US010103854B2

(12) United States Patent
Nakashima et al.

(10) Patent No.: US 10,103,854 B2
(45) Date of Patent: Oct. 16, 2018

(54) COMMUNICATION SYSTEM, MOBILE STATION DEVICE, BASE STATION DEVICE, COMMUNICATION METHOD, AND INTEGRATED CIRCUIT

(75) Inventors: Daiichiro Nakashima, Osaka (JP);
Kimihiko Imamura, Osaka (JP);
Toshizo Nogami, Osaka (JP);
Kazuyuki Shimezawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 425 days.

(21) Appl. No.: 14/113,966

(22) PCT Filed: Apr. 18, 2012

(86) PCT No.: PCT/JP2012/060418
§ 371 (c)(1),
(2), (4) Date: Oct. 25, 2013

(87) PCT Pub. No.: WO2012/147577
PCT Pub. Date: Nov. 1, 2012

(65) Prior Publication Data
US 2014/0050187 A1 Feb. 20, 2014

(30) Foreign Application Priority Data

Apr. 27, 2011 (JP) ................. 2011-099262

(51) Int. Cl.
*H04L 5/00* (2006.01)
*H04L 25/03* (2006.01)
*H04L 1/00* (2006.01)
*H04L 1/16* (2006.01)
*H04L 25/02* (2006.01)
*H04B 7/024* (2017.01)
*H04B 7/0413* (2017.01)

(52) U.S. Cl.
CPC .......... *H04L 5/0035* (2013.01); *H04L 5/0048* (2013.01); *H04L 5/0053* (2013.01);
(Continued)

(58) Field of Classification Search
CPC ... H04L 5/0048; H04L 5/0053; H04L 1/1671; H04L 25/0204; H04L 25/03898;
(Continued)

(56) References Cited

U.S. PATENT DOCUMENTS 8,472,954 B2 * 6/2013 Nogami ............... H04J 11/0069
370/350
8,848,606 B2 * 9/2014 Yamada ............ H04W 72/0453
370/328
(Continued)

FOREIGN PATENT DOCUMENTS

JP 2011-078019 A 1/2011

OTHER PUBLICATIONS

"Aspects on Distributed RRUs with Shared Cell-ID for Heterogeneous Deployments", 3GPP TSG-RAN WG1 #64, Taipei, Taiwan, Feb. 21-25, 2011, R1-110649.
(Continued)

*Primary Examiner* — Ian N Moore
*Assistant Examiner* — Latresa McCallum
(74) *Attorney, Agent, or Firm* — Birch, Stewart, Kolasch & Birch, LLP

(57) ABSTRACT

Different precoding processes are used among different regions. A transmit processor uses resources in a region to transmit the control channel and the reference signal. A mobile station device includes a controller that sets a region on the basis of announced information from the base station device, a propagation channel estimator that averages propagation channel variation estimation values from a plurality of reference signals within the region, and a control channel detector that uses the averaged propagation channel estimation values to detect the control channel that includes control information addressed to the mobile station device.

9 Claims, 16 Drawing Sheets

(52) U.S. Cl.
CPC ........ *H04L 25/03898* (2013.01); *H04B 7/024* (2013.01); *H04B 7/0413* (2013.01); *H04L 1/0041* (2013.01); *H04L 1/0054* (2013.01); *H04L 1/0059* (2013.01); *H04L 1/1671* (2013.01); *H04L 25/0204* (2013.01)

(58) Field of Classification Search
CPC ... H04L 1/0041; H04L 1/0054; H04L 1/0059; H04L 5/0035; H04B 7/024; H04B 7/0413
See application file for complete search history.

(56) References Cited

U.S. PATENT DOCUMENTS

| | | | | |
|---|---|---|---|---|
| 9,923,688 | B2* | 3/2018 | Imamura | H04L 5/0053 |
| 2008/0068981 | A1* | 3/2008 | Marinier | H04W 52/343 370/208 |
| 2012/0134275 | A1* | 5/2012 | Choi | H04L 5/0057 370/241 |
| 2012/0287848 | A1* | 11/2012 | Kim | H04L 5/0094 370/315 |
| 2013/0044712 | A1* | 2/2013 | Kim | H04L 5/0053 370/329 |
| 2014/0301287 | A1* | 10/2014 | Frenne | H04L 5/0048 370/329 |

OTHER PUBLICATIONS

"R-PDCCH Placement, 6.6.1.2 Backhaul Control Channnel Design", 3GPP TSG RAN WG1 Mtg #60bis, Beijing, China, Apr. 12-16, 2010, R1-102042, (6 pages).

* cited by examiner

COMMUNICATION SYSTEM, MOBILE
STATION DEVICE, BASE STATION DEVICE,
COMMUNICATION METHOD, AND
INTEGRATED CIRCUIT

TECHNICAL FIELD

The present invention relates to a communication system, a mobile station device, a base station device, a communication method, and an integrated circuit that, in a communication system made up of multiple mobile station devices and a base station device, efficiently set an region in which to place a signal including control information related to a data signal using a method such as cooperative communication, enabling a base station device to efficiently transmit a signal including control information to respective mobile station device groups, and enabling a mobile station device to efficiently receive a signal including control information from a base station device.

BACKGROUND ART

Advances in wireless access schemes and wireless networks for cellular mobile communication (hereinafter designated "Long Term Evolution (LTE)" or "Evolved Universal Terrestrial Radio Access (EUTRA)") have been standardized in the 3rd Generation Partnership Project (3GPP). With LTE, a multi-carrier transmission, orthogonal frequency-division multiplexing (OFDM) scheme is used as the communication scheme for wireless communication from a base station device to a mobile station device (hereinafter designated downlink or DL). Also, with LTE, a single-carrier transmission, single-carrier frequency-division multiple access (SC-FDMA) scheme is used as the communication scheme for wireless communication from a mobile station device to a base station device (hereinafter designated uplink or UL). With LTE, a discrete Fourier transform-spread OFDM (DFT-Spread OFDM) scheme is used as the SC-FDMA scheme.

With 3GPP, wireless access schemes and wireless networks that achieve even faster data communication over LTE (hereinafter designated Long Term Evolution-Advanced (LTE-A) or Advanced Evolved Universal Terrestrial Radio Access (A-EUTRA)) are being investigated. With LTE-A, the satisfaction of backward compatibility with LTE is demanded. There is demand for LTE-A to satisfy a base station device compatible with LTE-A simultaneously communicating with both mobile station devices compatible with LTE-A and mobile station devices compatible with LTE, as well as a mobile station device compatible with LTE-A communicating with a base station device compatible with LTE-A and a base station device compatible with LTE. In order to satisfy such demand, support of at least the same channel structure as LTE in LTE-A is being investigated. A channel means a medium used to transmit a signal. A channel used in the physical layer is designated a physical channel, while a channel used in the media access control (MAC) layer is designated a logical channel. Types of physical channels include the physical downlink shared channel (PDSCH) used to transmit and receive downlink data and control information, the physical downlink control channel (PDCCH) used to transmit and receive downlink control information, the physical uplink shared channel (PUSCH) used to transmit and receive uplink data and control information, the physical uplink control channel (PUCCH) used to transmit and receive control information, the synchronization channel (SCH) used to establish downlink synchronization, the physical random access channel (PRACH) used to establish uplink synchronization, the physical broadcast channel (PBCH) used to transmit downlink system information, and the like. A mobile station device or base station device places and transmits signals generated from control information, data, and the like on respective physical channels. Data transmitted on the physical downlink shared channel or the physical uplink shared channel is designated a transport block.

Control information placed on the physical uplink control channel is designated uplink control information (UCI). Uplink control information includes control information (a receive confirmation acknowledgement; ACK/NACK) indicating a positive acknowledgement (ACK) or a negative acknowledgement (NACK) with respect to received data placed on a physical downlink shared channel, control information (a scheduling request (SR)) indicating a request for the allocation of uplink resources, and/or control information (channel quality indicator (CQI)) indicating downlink reception quality (also designated the channel quality).

<Cooperative Communication>

With A-EUTRA, in order to reduce or suppress interference with respect to a mobile station device in a cell edge area, or in order to boost the reception signal power, inter-cell cooperative multipoint communication (CoMP communication) in which neighboring cells communicate cooperatively with each other is being investigated. For example, a "cell" designates a form by which a base station device communicates using an arbitrary single frequency band. For example, a method in which a weighting signal process (precoding process) that differs among multiple cells is applied to a signal, and multiple base station devices transmit the signal to the same mobile station device cooperatively (also designated joint processing or joint transmission) and the like is being investigated as inter-cell cooperative multipoint communication. With this method, the signal to interference plus noise power ratio of a mobile station device may be raised, and the reception properties in a mobile station device may be improved.

Note that for the multiple cells used in cooperative communication, different cells may be configured by different base station devices, different cells may be configured by separate remote radio heads (RRH, an outdoor radio unit smaller than a base station device; also called a remote radio unit (RRU)) managed by the same base station device, different cells may be configured by a base station device and RRHs managed by that base station device, or different cells may be managed by a base station device and RRHs managed by a base station device different from that base station device.

A base station device with wide coverage is generally designated a macro base station device. A base station device with narrow coverage is generally designated a pico base station device or a femto base station device. RRHs are generally being investigated for operation in areas of narrower coverage than macro base station devices. A deployment such as a communication system made up of a macro base station device and an RRH, and in which the coverage supported by the macro base station device includes all or part of the coverage supported by the RRH, is designated a heterogeneous network deployment. In a communication system with such a heterogeneous network deployment, a method in which the macro base station device and the RRH cooperate to transmit a signal to a mobile station device positioned in a mutually overlapping coverage area is being investigated. Herein, the RRH is managed by, and transmitting/receiving is controlled by, the macro base station device. Note that the macro base station device and the RRH are connected by a wired link such as optical fiber, and/or by a wireless link using relay technology. In this way, by having a macro base station device and an RRH respectively use all or part of the same radio resource to execute cooperative communication, overall frequency utilization efficiency (transmission capacity) may be raised within the area of coverage constructed by the macro base station device.

In the case of being positioned near a macro base station device or an RRH, a mobile station device is able to conduct single-cell communication with the macro base station device or RRH. In other words, a given mobile station device communicates with a macro base station device or RRH without using cooperative communication, and transmits or receives a signal. Furthermore, in the case the mobile station device is positioned near the edge of coverage constructed by the RRH (a cell edge), provision against co-channel interference from the macro base station device becomes necessary. For multi-cell communication (cooperative communication) between a macro base station device and an RRH, a method that reduces or suppresses interference with respect to a mobile station device in a cell edge area by using a CoMP scheme in which neighboring base stations cooperate with each other is being investigated.

Regarding the receive processing of a data signal at a mobile station device, it is necessary to acquire control information indicating the modulation scheme, the code rate, the number of spatially-multiplexed streams, the transmission power adjustment value, resource allocation, and the like. With A-EUTRA, a method of improving the capacity and/or coverage of control information regarding a data signal using cooperative communication is being investigated (NPL 1). In other words, improvement in the reception properties of control information regarding a data signal using cooperative communication is being investigated. For example, the application of cooperative communication to control information regarding a data signal using cooperative communication as well is being investigated. Specifically, there is investigation of multiple base station devices and multiple RRUs compatible with A-EUTRA applying a precoding process (beamforming process) to a signal including control information, also applying the same precoding process (beamforming process) to a reference signal (RS) for demodulating that control information, placing that signal including control information, and that RS, in a resource region in which a PDSCH is placed in EUTRA, and transmitting a signal. There is also investigation of a mobile station device compatible with A-EUTRA using a received RS that has been subjected to a precoding process to demodulate a signal including control information that has been subjected to the same precoding process, and acquiring control information transmitted by cooperative communication. This method eliminates the need for a base station device and a mobile station device to exchange information related to the precoding process applied to a signal including control information.

CITATION LIST

Non Patent Literature

NPL 1: 3GPP TSG RAN1 #64, Taipei, Taiwan, 21-25, February, 2011, R-110649 "Aspects on Distributed RRUs with Shared Cell-ID for Heterogeneous Deployments".

SUMMARY OF INVENTION

Technical Problem

NPL 1 does not describe details of a process of detecting a control signal in a mobile station device. However, in EUTRA, having a mobile station device conduct a process of detecting a signal that includes control information addressed to the device itself on all reception signals in the region of a resource in which a PDSCH is placed is not preferable from the perspective of process complexity in the mobile station device. In addition, conducting such a process is also not preferable from the perspective of the possibility that a mobile station device may mistakenly judge that control information addressed to the device itself is included, even though control information addressed to the device itself is not actually included. Given the above, it is desirable to limit the potential regions in which a signal including control information may be placed.

The present invention has been devised in light of the above points, and an object thereof relates to a communication system, a mobile station device, a base station device, a communication method, and an integrated circuit that, in a communication system made up of multiple mobile station devices and a base station device, efficiently set an region in which to place a signal including control information related to a data signal using a method such as cooperative communication, enabling a base station device to efficiently transmit a signal including control information to respective mobile station device groups, and enabling a mobile station device to efficiently receive a signal including control information from a base station device.

Solution to Problem

According to an embodiment, there is provided a communication system comprising a plurality of mobile station devices and a base station device that communicates with the plurality of mobile station devices. The base station device includes a precoding processor that conducts the same precoding process on a control channel and a reference signal, a base station device controller that sets a plurality of regions, being an region of resources in which the reference signal is placed and the control channel is potentially placed, for which a common precoding process is used within an region, and different precoding processes are used among different regions, and a transmit processor that uses resources in an region to transmit the control channel and the reference signal. The mobile station device includes a mobile station device controller that sets the region on the basis of announced information from the base station device, a propagation channel estimator that averages propagation channel variation estimation values estimated from a plurality of the reference signals within the region, and a control channel detector that conducts a process of using the averaged propagation channel estimation values to detect the control channel that includes control information addressed to the mobile station device itself.

Preferably, the base station device controller sets different regions per a device that includes a radio unit that conducts cooperative communication together with the base station device itself.

According to another embodiment, there is provided a mobile station device that communicates with a base station device, and receives from the base station device a control channel and a reference signal that have been subjected to the same precoding process. The mobile station device includes a mobile station device controller that sets an region of resources in which the reference signal is placed and the control channel is potentially placed, a propagation channel estimator that averages propagation channel variation estimation values estimated from a plurality of the reference signals within the region, and a control channel detector that conducts a process of using the averaged propagation channel estimation values to detect the control channel that includes control information addressed to the mobile station device itself.

According to yet another embodiment, there is provided a base station device that communicates with a plurality of mobile station devices. The base station device includes a precoding processor that conducts the same precoding process on a control channel and a reference signal, a base station device controller that sets a plurality of regions, being an region of resources in which the reference signal is placed and the control channel is potentially placed, for which a common precoding process is used within an region, and different precoding processes are used among different regions, and a transmit processor that uses resources in an region to transmit the control channel and the reference signal.

Preferably, the base station device controller sets different regions per a device that includes a radio unit that conducts cooperative communication together with the base station device itself.

According to yet another embodiment, there is provided communication method used by a mobile station device that communicates with a base station device, and receives from the base station device a control channel and a reference signal that have been subjected to the same precoding process. The communication method at least includes a step of setting an region of resources in which the reference signal is placed and the control channel is potentially placed, a step of averaging propagation channel variation estimation values estimated from a plurality of the reference signals within the region, and a step of conducting a process of using the averaged propagation channel estimation values to detect the control channel that includes control information addressed to the mobile station device itself.

According to yet another embodiment, there is provided a communication method used by a base station device that communicates with a plurality of mobile station devices. The communication method at least includes a step of conducting the same precoding process on a control channel and a reference signal, a step of setting a plurality of regions, being an region of resources in which the reference signal is placed and the control channel is potentially placed, for which a common precoding process is used within an region, and different precoding processes are used among different regions, and a step of using resources in an region to transmit the control channel and the reference signal.

According to yet another embodiment, there is provided an integrated circuit that, by being implemented in a mobile station device, causes the mobile station device to exhibit a plurality of functions. The integrated circuit causes the mobile station device to exhibit a series of functions including a function of communicating with a base station device and receiving from the base station device a control channel and a reference signal that have been subjected to the same precoding process, a function of setting an region of resources in which the reference signal and the control channel are potentially placed, a function of averaging propagation channel variation estimation values estimated from a plurality of reference signals within the region, and a function of conducting a process of using the averaged propagation channel estimation values to detect a control channel that includes control information addressed to the mobile station device itself.

According to yet another embodiment, there is provided an integrated circuit that, by being implemented in a base station device, causes the base station device to exhibit a plurality of functions. The integrated circuit causes the base station device to exhibit a series of functions including a function of communicating with a plurality of mobile station devices, a function of conducting the same precoding process on a control channel and a reference signal, a function of setting a plurality of regions, being an region of resources in which the reference signal is placed and the control channel is potentially placed, for which a common precoding process is used within an region, and different precoding processes are used among different regions, and a function of using resources in an region to transmit the control channel and the reference signal.

Advantageous Effects of Invention

According to the invention, a base station device is able to efficiently transmit a signal including control information to respective mobile station device groups, a mobile station device is able to efficiently receive a signal including control information from a base station device, and an even more efficient communication system may be realized.

DESCRIPTION OF EMBODIMENTS

Hereinafter, embodiments of the present invention will be described in detail and with reference to the drawings. First, FIGS. 9 to 16 will be used to describe an overview of a communication system, a radio frame structure, and the like according to the present embodiment. Next, FIGS. 1 to 6 will be used to describe a configuration of a communication system according to the present embodiment. Lastly, FIGS. 7 to 8 will be used to describe an operational process of a communication system according to the present embodiment.

<Overview of Communication System>

Figure 9:
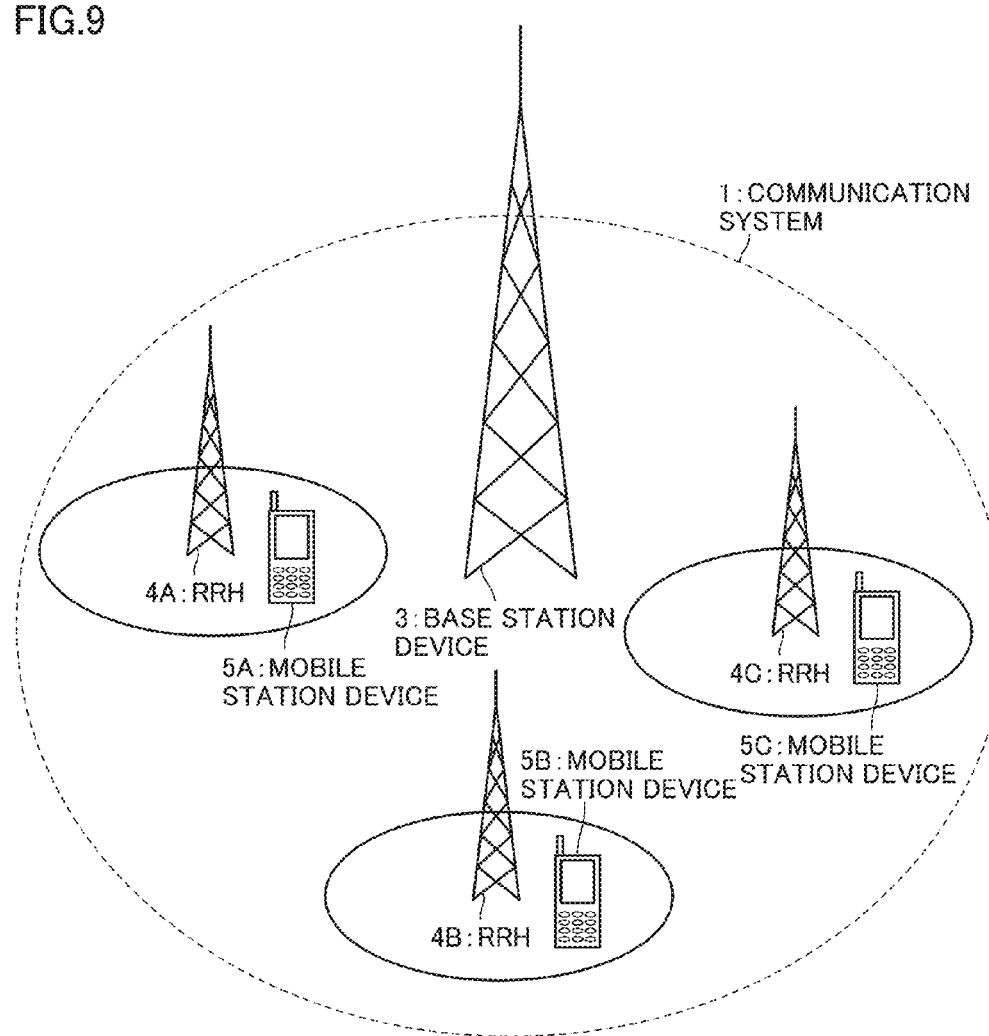
FIG. 9 is a diagram outlining an overview of a communication system according to an embodiment of the present invention.

FIG. 9 is a diagram outlining an overview of a communication system according to an embodiment of the present invention. In the communication system 1 illustrated by this drawing, a base station device (also designated eNodeB or NodeB) 3, multiple remote radio heads (RRH, an outdoor radio unit smaller than a base station device; also called a remote radio unit (RRU)) 4A, 4B, and 4C, and multiple mobile station devices (also designated user equipment (UE)) 5A, 5B, and 5C communicate. Hereinafter, in the present embodiment, the RRHs 4A, 4B, and 4C will be designated the RRHs 4, the mobile station devices 5A, 5B, and 5C will be designated the mobile station devices 5, and will be described appropriately. In the communication system 1, the base station device 3 and the RRHs 4 cooperate to communicate with the mobile station devices 5. In FIG. 9, the base station device 3 and the RRH 4A cooperatively communicate with the mobile station device 5A, the base station device 3 and the RRH 4B cooperatively communicate with the mobile station device 5B, and the base station device 3 and the RRH 4C cooperatively communicate with the mobile station device 5C.

<Cooperative Communication>

In the communication system 1 according to an embodiment of the present invention, in order to reduce or suppress interference with respect to the mobile station devices 5, or in order to boost the reception signal power, cooperative multipoint communication (CoMP communication), in which neighboring cells communicate cooperatively with each other, is used to transmit data signals. For example, a "cell" designates a form by which the base station device 3 communicates using an arbitrary single frequency band. For example, a weighting signal process (precoding process) that differs among multiple cells (the base station device 3 and the RRHs 4) is applied to a signal, and the base station device 3 and RRHs 4 cooperate to transmit the signal to the same mobile station device 5 as cooperative multipoint communication. By using this method, the signal to interference plus noise power ratio of the mobile station devices 5 may be raised, and the reception properties in the mobile station devices 5 may be improved.

Note that, although not described in the embodiment of the present invention, for the multiple cells used in cooperative communication, different cells may be configured by different base station devices 3, different cells may be configured by separate RRHs 4 managed by the same base station device 3, or different cells may be managed by a base station device 3 and RRHs 4 managed by a base station device 3 different from that base station device 3.

The deployment of the communication system 1 in the embodiment of the present invention is anticipated to be a heterogeneous network deployment. The communication system 1 is made up of the base station device 3 and the RRHs 4, and is configured such that the coverage supported by the base station device 3 includes all or part of the coverage supported by the RRHs 4. Herein, coverage means an area in which communication may be achieved while satisfying demands. In the communication system 1, the base station device 3 and the RRHs 4 cooperate to transmit a signal to the mobile station devices 5 positioned in mutually overlapping coverage areas. Herein, the RRHs 4 are managed by, and transmitting/receiving is controlled by, the base station device 3. Note that the base station device 3 and the RRHs 4 are connected by a wired link such as optical fiber, and/or by a wireless link using relay technology. In this way, by having the base station device 3 and the RRHs 4 respectively use all or part of the same radio resource to execute cooperative communication, overall frequency utilization efficiency (transmission capacity) may be raised within the area of coverage constructed by the base station device 3.

In the case of being positioned near the base station device 3 or an RRH 4, a mobile station device 5 may also use single-cell communication with the base station device 3 or RRH 4. In other words, a given mobile station device 5 communicates with the base station device 3 or RRH 4 without using cooperative communication, and transmits or receives a signal.

In the communication system 1, the downlink (DL), that is, the communication direction from the base station device 3 or RRHs 4 to the mobile station devices 5, is configured to include a downlink pilot channel, a physical downlink control channel (PDCCH), and a physical downlink shared channel (PDSCH). On the PDSCH, cooperative communication may be applied or not applied. The PDCCH is made up of a first PDCCH that includes downlink control information for a PDSCH to which cooperative communication is not applied, and a second PDCCH that includes downlink control information for a PDSCH to which cooperative communication is applied. The downlink pilot channel is made up of a first reference signal used to demodulate a PDSCH to which cooperative communication is not applied and the first PDCCH, and a second reference signal used to demodulate a PDSCH to which cooperative communication is applied and the second PDCCH.

Note that, if viewed from one perspective, the first PDCCH is a physical channel used by the same transmit port (antenna port, transmit antenna) as the first reference signal. Meanwhile, the second PDCCH is a physical channel used by the same transmit port as the second reference signal. The mobile station devices 5 uses the first reference signal to demodulate a signal mapped to the first POOCH, and use the second reference signal to demodulate a signal mapped to the second PDCCH. The first reference signal is a reference signal common to all mobile station devices 5 within a cell, and is a reference signal that is inserted into nearly all resource blocks and usable by any mobile station device 5. For this reason, the first PDCCH may be demodulated by any mobile station device 5. On the other hand, the second reference signal is a reference signal inserted into only an allocated resource block, to which a precoding process (beamforming process) is adaptively applied in the same way as data. For this reason, on the second PDCCH, an adaptive beamforming gain (precoding gain) is obtained.

Also, in the communication system 1, the uplink (UL), that is, the communication direction from the mobile station devices 5 to the base station device 3 or RRHs 4, is configured to include a physical uplink shared channel (PUSCH), an uplink pilot channel, and a physical uplink control channel (PUCCH). A channel means a medium used to transmit a signal. A channel used in the physical layer is designated a physical channel, while a channel used in the media access control (MAC) layer is designated a logical channel.

Also, the present invention is applicable to a communication system in the case of applying cooperative communication to at least the downlink, and although the case of not applying cooperative communication to the uplink is described for the sake of simplicity, the present invention is not limited to such a case.

The PDSCH is a physical channel used to transmit and receive downlink data and control information. The PDCCH is a physical channel used to transmit and receive downlink control information. The PUSCH is a physical channel used to transmit and receive uplink data and control information. The PUCCH is a physical channel used to transmit and receive uplink control information (UCI). A reception confirmation acknowledgement (ACK/NACK) indicating a positive acknowledgement (ACK) or a negative acknowledgement (NACK) with respect to downlink data on the PDSCH, as well as a scheduling request (SR) indicating whether or not resource allocation is requested, and the like are used as types of UCI. A synchronization channel (SCH) used to establish downlink synchronization, a physical random access channel (PRACH) used to establish uplink synchronization, and a physical broadcast channel (PBCH) used to transmit downlink system information (also designated a system information block (SIB)), and the like are used as other types of physical channels. In addition, the PDSCH is also used to transmit downlink system information.

The mobile station devices 5, the base station device 3, or the RRHs 4 place and transmit signals generated from control information, data, and the like on respective physical channels. Data transmitted on the physical downlink shared channel or the physical uplink shared channel is designated a transport block. Also, an area under the control of the base station device 3 or an RRH 4 is designated a cell.

<Downlink Time Frame Structure>

Figure 10:
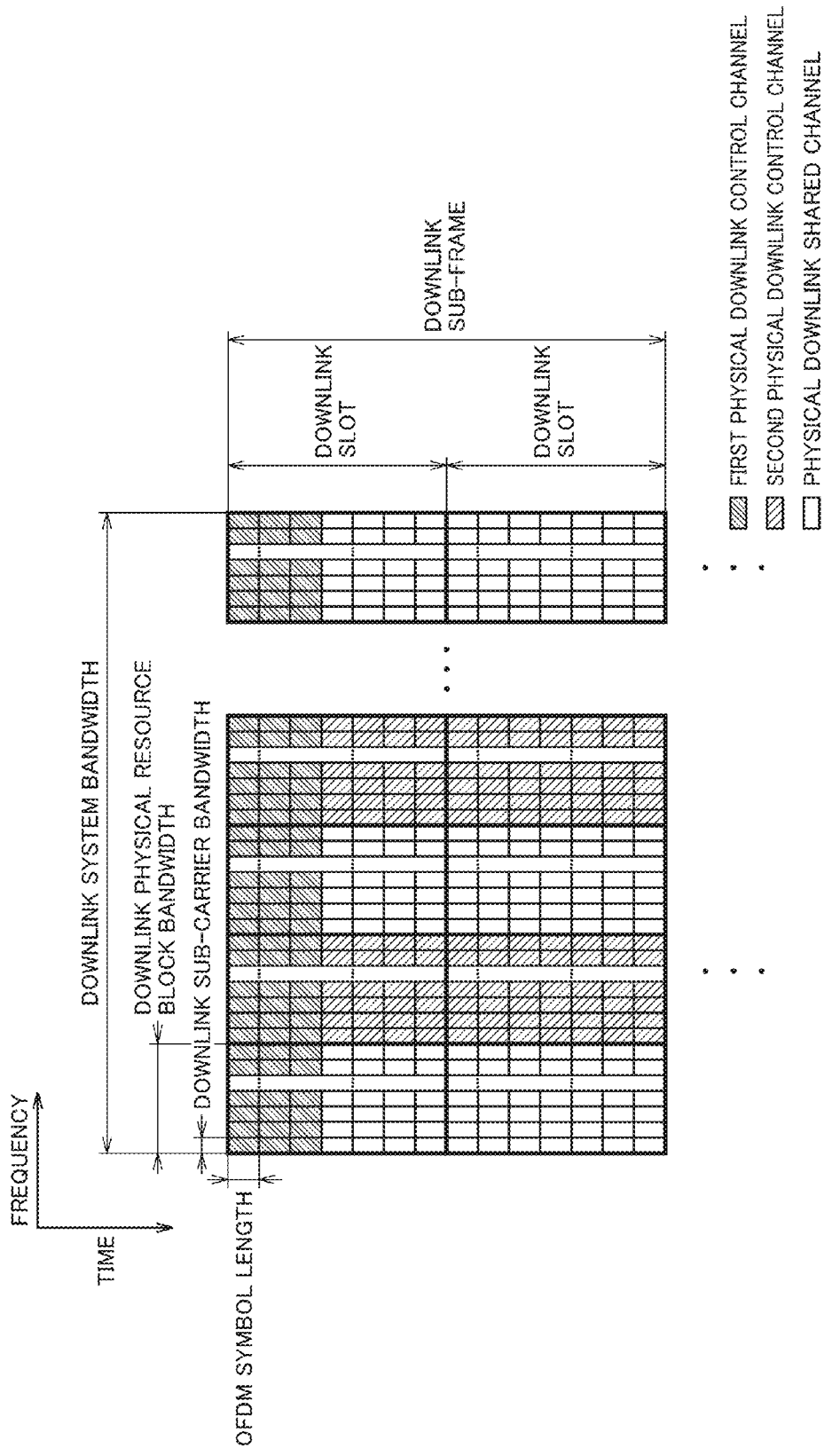
FIG. 10 is a diagram illustrating a diagrammatic structure of a downlink time frame from a base station device or RRH to a mobile station device according to an embodiment of the present invention.

FIG. 10 is a diagram illustrating a diagrammatic structure of a downlink time frame from the base station device 3 or an RRH 4 to a mobile station device 5 according to an embodiment of the present invention. In this drawing, the horizontal axis represents the time domain, while the vertical axis represents the frequency domain. A downlink time frame is a unit of resource allocation or the like, and is made up of pairs of resource blocks (RBs) (also designated physical resource blocks (PRBs)) consisting of a downlink frequency band and time band of predetermined width (physical resource block pairs (PRB pairs)). One physical resource block pair on the downlink (designated a downlink physical resource block pair) is made up of two consecutive physical resource blocks in the time domain on the downlink (designated downlink physical resource blocks).

Also, in this drawing, one downlink physical resource block is made up of 12 sub-carriers in the downlink frequency domain (also designated downlink sub-carriers), and is made up of 7 orthogonal frequency-division multiplexing (OFDM) symbols in the time domain. A system band for the downlink (designated the downlink system band) is the downlink communication band of the base station device 3 or an RRH 4. For example, the system bandwidth for the downlink (designated the downlink system bandwidth) is made up of a 20 MHz frequency bandwidth.

Note that in the downlink system band, multiple downlink physical resource blocks are placed according to the downlink system bandwidth. For example, a downlink system band with a 20 MHz frequency bandwidth is made up of 110 downlink physical resource blocks.

Also, in the time domain illustrated in this drawing, there are slots made up of 7 OFDM symbols (designated downlink slots), and a sub-frame made up of two downlink slots (designated a downlink sub-frame). Note that a unit made up of one downlink sub-carrier and one OFDM symbol is designated a resource element (RE) (downlink resource element). In each downlink sub-frame there are at least placed a PDSCH used to transmit information data (also designated a transport block), a first PDCCH used to transmit control information for a PDSCH to which cooperative communication is not applied (single-cell transmission), and a second PDCCH used to transmit control information for a PDSCH to which cooperative communication is applied (multi-cell transmission). In this drawing, the first PDCCH is made up of the first to third OFDM symbols in the downlink sub-frame, while the PDSCH and the second PDCCH are made up the fourth to fourteenth OFDM symbols in the downlink sub-frame. Note that the PDSCH and the second PDCCH are placed in different downlink resource blocks. Note that the number of OFDM symbols making up the first PDCCH and the number of OFDM symbols making up the PDSCH and/or the second PDCCH may also be changed for each downlink sub-frame. Note that the number of OFDM symbols making up the second PDCCH may not be fixed. For example, the second PDCCH may be made up of the fourth to fourteenth OFDM symbols of the downlink sub-frame, irrespective of the number of OFDM symbols making up the first PDCCH and/or the number of OFDM symbols making up the PDSCH.

Although not illustrated in this drawing, downlink pilot channels used to transmit a reference signal (RS) for the downlink (designated the downlink reference signal) are placed distributed in multiple downlink resource elements. Herein, the downlink reference signal is made up of at least a first reference signal and a second reference signal of different types. For example, the downlink reference signal is used to estimate propagation channel variation in the PDSCH and the PDCCHs (the first PDCCH and the second PDCCH). The first reference signal is used to demodulate a PDSCH to which cooperative communication is not applied and the first PDCCH, and is also designated the cell-specific RS. The second reference signal is used to demodulate a PDSCH to which cooperative communication is applied and/or the second PDCCH, and is also designated the UE-specific RS. The downlink reference signal is a known signal in the communication system 1. Note that the number of downlink resource elements making up the downlink reference signal may also depend on the number of transmit antennas (antenna ports) used to transmit to mobile station devices 5 in the base station device 3 and/or the RRHs 4.

On a PDCCH (the first PDCCH or the second PDCCH), there is placed a signal generated from control information, such as information indicating the allocation of downlink physical resource block for the PDSCH, information indicating the allocation of an uplink physical resource block for the PUSCH, and information indicating a mobile station device identifier (also designated a radio network temporary identifier (RNTI)), the modulation scheme, the code rate, retransmission parameters, the number of spatially-multiplexed streams, a precoding matrix, and transmit power control commands (TPC commands). Control information included on the PDCCH is designated downlink control information (DCI). DCI that includes information indicating the allocation of a downlink physical resource block for the PDSCH is designated a downlink assignment (DL assignment; also designated a downlink grant), while DCI that includes information indicating the allocation of an uplink physical resource block for the PUSCH is designated an uplink grant (UL grant). Note that a downlink assignment includes transmit power control commands for the PUCCH. Note that an uplink assignment includes transmit power control commands for the PUSCH. Note that one PDCCH only includes information indicating resource allocation to one PDSCH, or information indicating resource allocation to one PUSCH, and does not include information indicating resource allocation to multiple PDSCHs or information indicating resource allocation to multiple PUSCHs.

Figure 11:
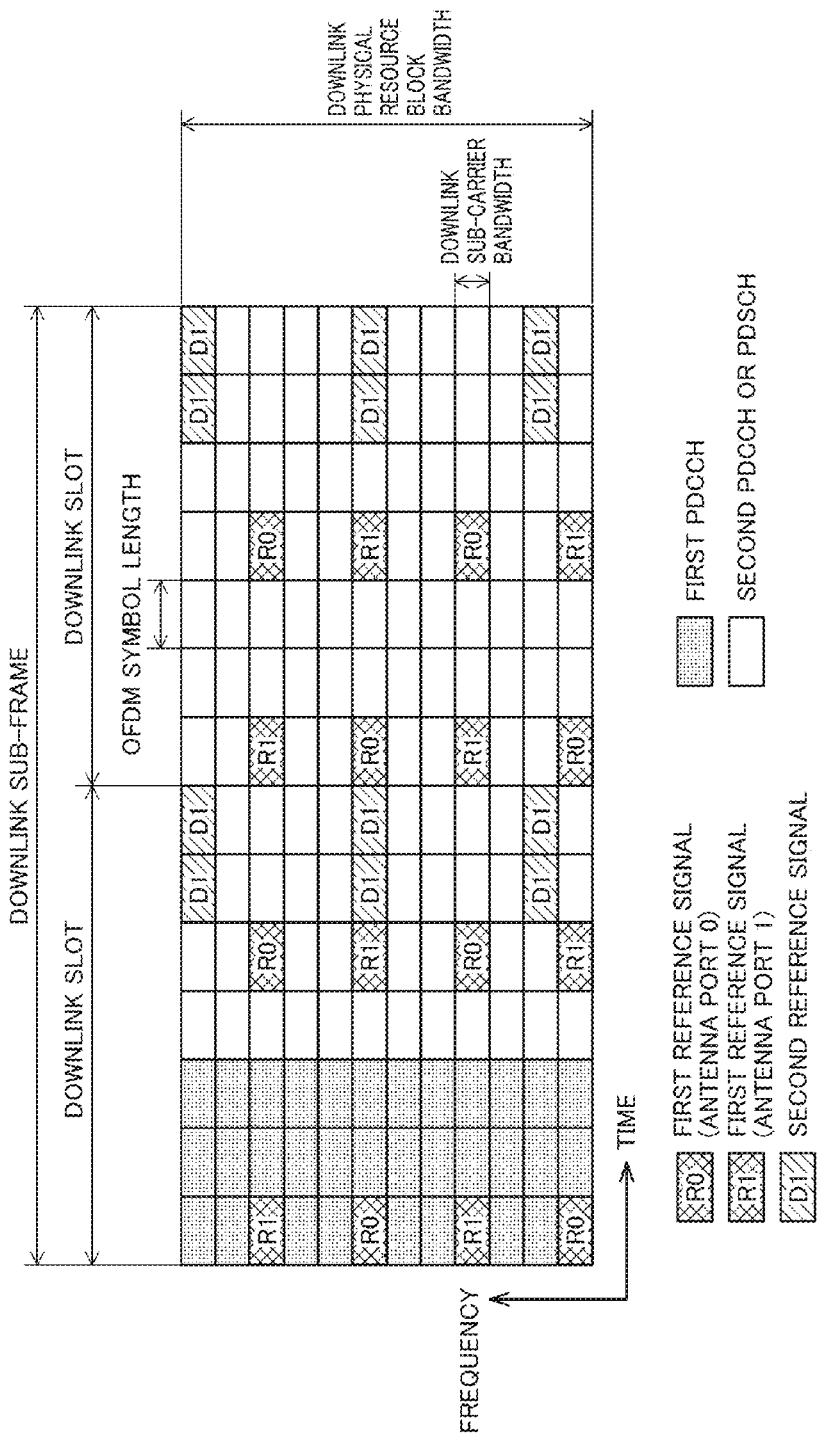
FIG. 11 is a diagram illustrating an example of downlink reference signal placement within a downlink sub-frame in a communication system according to an embodiment of the present invention.

Downlink reference signal placement will now be described. FIG. 11 is a diagram illustrating an example of downlink reference signal placement within a downlink sub-frame in a communication system 1 according to an embodiment of the present invention. For the sake of simplicity, FIG. 11 describes downlink reference signal placement within one physical resource block pair, but basically there is used a placement method that is shared in common among all downlink physical resource block pairs within a downlink system band.

Among the shaded downlink resource elements, R0 and R1 indicate first reference signals for respective antenna ports 0 and 1. Herein, an antenna port means a logical antenna used in signal processing, and one antenna port may be made up of multiple physical antennas. Multiple physical antennas making up the same antenna port transmit the same signal. Within the same antenna port, multiple physical antennas may be used, and delay diversity or cyclic delay diversity (CDD) may be applied, but the use of other signal processing is not possible. Herein, although FIG. 11 illustrates a case in which the first reference signal corresponds to two antenna ports, but may also correspond to a different number of antenna ports in the communication system of the present embodiment. For example, a first reference signal for one antenna port or four antenna ports may also be mapped to downlink resources.

Among the shaded downlink resource elements, D1 indicates a second reference signal. In the case of using multiple antenna ports to transmit a second reference signal, a different code is used for each antenna port. In other words, code-division multiplexing (CDM) is applied to the second reference signal. Herein, in the second reference signal, the length of codes used for CDM and/or the number of mapped downlink resource elements may be varied according to the types of signal processing (number of antenna ports) used on a control signal and/or data signal mapped to that physical resource block pair. For example, in the case in which the number of antenna ports of the base station device 3 used for cooperative communication is two, codes with a code length of 2 are used to multiplex and place second reference signals, taking two downlink resource elements in the time domain (OFDM symbols) that are consecutive in the same frequency domain (sub-carrier) as one unit (the unit of CDM). In other words, in this case, CDM is applied to the multiplexing of the second reference signal. For example, in the case where the number of antenna ports of the base station device 3 used for cooperative communication is four, the number of downlink resource elements to which is mapped a second reference signal is doubled, and second reference signals are multiplexed and placed in downlink resource elements that differ every two antenna ports. In other words, in this case, CDM and frequency-division multiplexing (FDM) is applied to the multiplexing of the second reference signal. For example, in the case where the number of antenna ports of the base station device 3 used for cooperative communication is eight, the number of downlink resource elements to which is mapped a second reference signal is doubled, and codes with a code length of 4 are used to multiplex and place second reference signals, taking four downlink resource elements as a single unit. In other words, in this case, CDM of a different code length is applied to the multiplexing of the second reference signal.

Also, in the second reference signal, a scrambling code for the code of each antenna port is additionally overlapped. This scrambling code is generated on the basis of a cell ID and a scrambling ID announced from the base station device 3. For example, a scrambling code is generated from a pseudo-noise sequence generated on the basis of a cell ID and a scrambling ID announced from the base station device 3. For example, the scrambling ID is a value indicating 0 or 1. Also, the scrambling ID and antenna port to be used may be jointly coded, and information indicating these may be indexed.

<Uplink Time Frame Structure>

Figure 12:
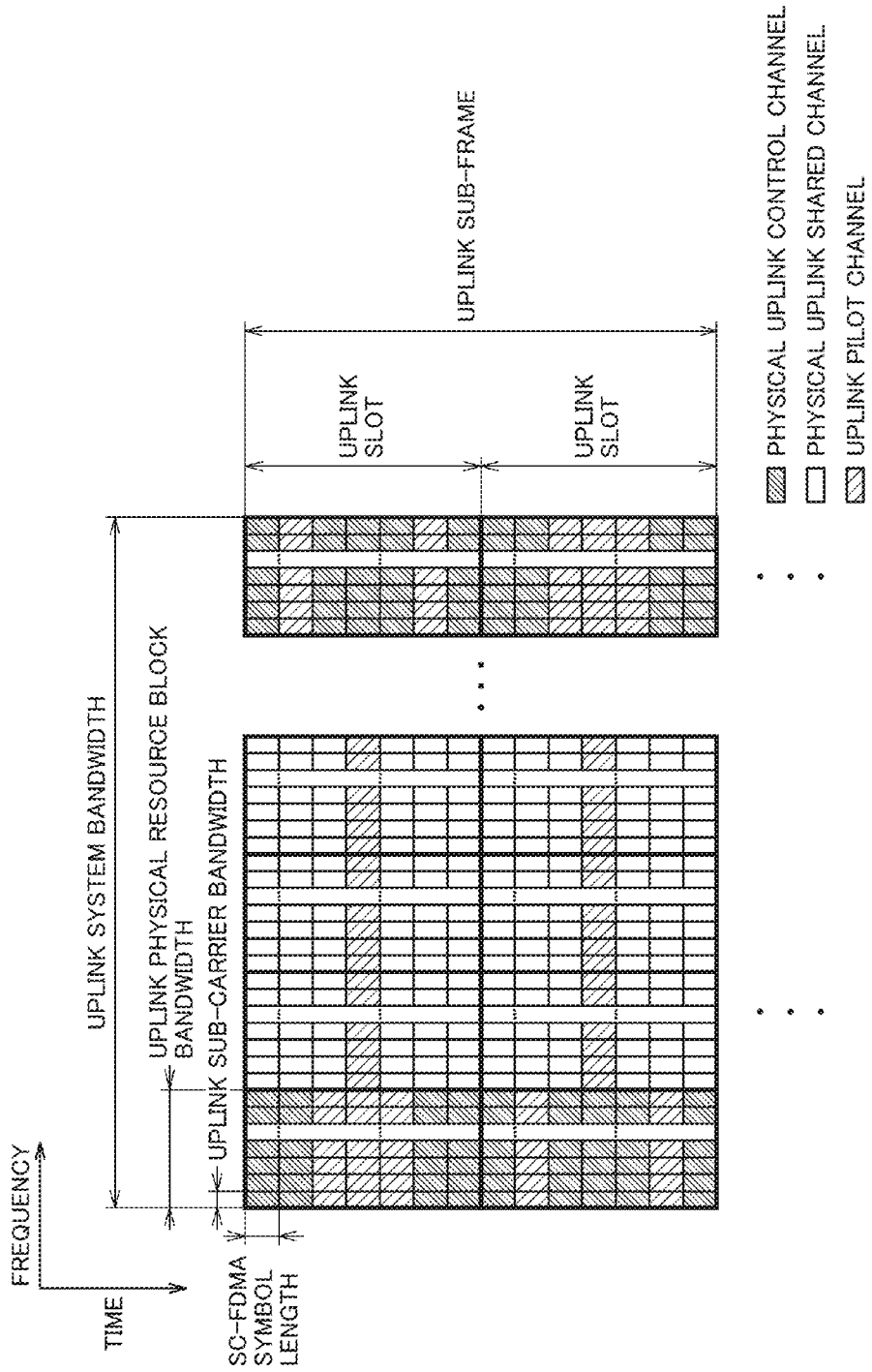
FIG. 12 is a diagram illustrating a diagrammatic structure of an uplink time frame from a mobile station device to a base station device according to an embodiment of the present invention.

FIG. 12 is a diagram illustrating a diagrammatic structure of an uplink time frame from a mobile station device 5 to a base station device 3 or an RRH 4 according to an embodiment of the present invention. In this drawing, the horizontal axis represents the time domain, while the vertical axis represents the frequency domain. An uplink time frame is a unit of resource allocation or the like, and is made up of pairs of physical resource blocks consisting of an uplink frequency band and time band of predetermined width (designated uplink physical resource block pairs). One uplink physical resource block pair is made up of two consecutive uplink physical resource blocks in the time domain on the uplink (designated uplink physical resource blocks).

Also, in this drawing, one uplink physical resource block is made up of 12 sub-carriers in the uplink frequency domain (designated uplink sub-carriers), and is made up of seven single-carrier frequency-division multiple access (SC-FDMA) symbols in the time domain. A system band for the uplink (designated the uplink system band) is the uplink communication band of the base station device 3. The system bandwidth for the uplink (designated the uplink system bandwidth) is made up of a 20 MHz frequency bandwidth, for example.

Note that in the uplink system band, multiple uplink physical resource blocks are placed according to the uplink system bandwidth. For example, an uplink system band with a 20 MHz frequency bandwidth is made up of 110 uplink physical resource blocks. Also, in the time domain illustrated in this drawing, there are slots made up of 7 SC- FDMA symbols (designated uplink slots), and a sub-frame made up of two uplink slots (designated an uplink sub-frame). Note that a unit made up of one uplink sub-carrier and one SC-FDMA symbol is designated a resource element (designated an uplink resource element).

In each uplink sub-frame, there are at least placed a PUSCH used to transmit information data, and a PUCCH used to transmit uplink control information (UCI) are placed. The PUCCH is used to transmit UCI (ACK/NACK) indicating a positive acknowledgement (ACK) or a negative acknowledgement (NACK) with respect to received data received using a PDSCH, UCI (a scheduling request (SR)) at least indicating whether or not uplink resource allocation is requested, and UCI (a channel quality indicator (CQI)) indicating downlink reception quality (also designated the channel quality).

Note that in the case in which a mobile station device 5 indicates to the base station device 3 that uplink resource allocation is requested, the mobile station device 5 transmits a signal on a PUCCH for transmitting an SR. As a result of detecting a signal on the resource of the PUCCH for transmitting an SR, the base station device 3 recognizes that a mobile station device 5 is requesting uplink resource allocation. In the case in which a mobile station device 5 indicates to the base station device 3 that uplink resource allocation is not requested, the mobile station device 5 does not transmit any signals on a pre-allocated resource of a PUCCH for transmitting an SR. As a result of not detecting a signal on the resource of the PUCCH for transmitting an SR, the base station device 3 recognizes that a mobile station device 5 is not requesting uplink resource allocation.

Also, mutually different types of signal structures are used for the PUCCH for the case of transmitting UCI consisting of an ACK/NACK, the case of transmitting UCI consisting of an SR, and the case of transmitting UCI consisting of a CQI. A PUCCH used to transmit an ACK/NACK is designated the PUCCH format 1a or the PUCCH format 1b. In the PUCCH format 1a, binary phase-shift keying (BPSK) is used as the modulation scheme that modulates information related to an ACK/NACK. In the PUCCH format 1a, 1-bit information is indicated from the modulated signal. In the PUCCH format 1b, quadrature phase-shift keying (QPSK) is used as the modulation scheme that modulates information related to an ACK/NACK. In the PUCCH format 1b, 2-bit information is indicated from the modulated signal. A PUCCH used to transmit an SR is designated the PUCCH format 1. A PUCCH used to transmit a CQI is designated the PUCCH format 2. A PUCCH used to simultaneously transmit a CQI and an ACK/NACK is designated the PUCCH format 2a or the PUCCH format 2b. In the PUCCH format 2b, a modulated signal generated from ACK/NACK information is multiplied by a reference signal on an uplink pilot channel. In the PUCCH format 2a, 1-bit information related to an ACK/NACK and CQI information is transmitted. In the PUCCH format 2b, 2-bit information related to an ACK/NACK and CQI information is transmitted.

Note that one PUSCH is made up of one or more uplink physical resource blocks, while one PUCCH is made up of two uplink physical resource blocks that exist in a symmetrical relationship in the frequency domain within the uplink system band, and are positioned in different uplink slots. For example, in FIG. 12, within the uplink sub-frame, one uplink physical resource block pair used for a PUCCH is made up of the uplink physical resource block with the lowest frequency in the first uplink slot, and the uplink physical resource block with the highest frequency in the second uplink slot. Note that a mobile station device 5 transmits a signal using only PUSCH resources in the case in which a mobile station device are set not to transmit the PUSCH and the PUCCH simultaneously and PUCCH resources and PUSCH resources are allocated in the same uplink sub-frame. Note that a mobile station device 5 is basically able to transmit a signal using both PUCCH resources and PUSCH resources in the case in which a mobile station device are set not to transmit simultaneously the PUSCH and the PUCCH and PUCCH resources and PUSCH resources are allocated in the same uplink sub-frame.

The uplink pilot channel is placed in different SC-FDMA symbols or the same SC-FDMA symbol according to the case of being placed within the same uplink physical resource block as the PUSCH, or the case of being placed within the same uplink physical resource block as the PUCCH. The uplink pilot channel is used to transmit an uplink reference signal (UL RS). Herein, the uplink reference signal is used to estimate propagation channel variation for the PUSCH and the PUCCH, and is a known signal in the communication system 1.

The uplink pilot channel is placed in the fourth SC-FDMA symbol within the uplink slot in the case of being placed within the same uplink physical resource block as the PUSCH. The uplink pilot channel is placed in the third, fourth, and fifth SC-FDMA symbols within the uplink slot in the case of being placed within the same uplink physical resource block as a PUCCH that includes an ACK/NACK. The uplink pilot channel is placed in the third, fourth, and fifth SC-FDMA symbols within the uplink slot in the case of being placed within the same uplink physical resource block as a PUCCH that includes an SR. The uplink pilot channel is placed in the second and sixth SC-FDMA symbols within the uplink slot in the case of being placed within the same uplink physical resource block as a PUCCH that includes a CQI.

Although FIG. 12 illustrates a case in which the PUCCH is placed in the uplink physical resource blocks at the edges, uplink physical resource blocks such as the second or the third from the edges of the uplink system band may also be used for the first PUCCH. Note that code-division multiplexing in the frequency domain and code-division multiplexing in the time domain are used in the PUCCH. With code-division multiplexing in the frequency domain, respective codes in a code sequence are processed in sub-carrier units by being multiplied by a modulated signal that has been modulated from uplink control information. With code-division multiplexing in the time domain, respective codes in a code sequence are processed in SC-FDMA symbol units by being multiplied by a modulated signal that has been modulated from uplink control information. Multiple PUCCHs are placed in the same uplink physical resource block, a different code sequence is allocated to each PUCCH, and code-division multiplexing in the frequency domain or the time domain is realized with the allocated code sequences. In a PUCCH used to transmit an ACK/NACK (PUCCH format 1a, PUCCH format 1b), code-division multiplexing in the frequency domain and the time domain is used. In a PUCCH used to transmit an SR (PUCCH format 1), code-division multiplexing in the frequency domain and the time domain is used. In a PUCCH used to transmit a CQI (PUCCH format 2), code-division multiplexing in the frequency domain is used. Note that for the sake of simplicity, a description of content regarding the code-division multiplexing of PUCCHs is not given where appropriate.

A PDSCH resource is placed in the time domain in the same downlink sub-frame as the downlink sub-frame in which is placed a PDCCH resource that includes a downlink assignment used to allocate a resource to that PDSCH.

<PDCCH Structure>

The PDCCHs (first PDCCH, second PDCCH) are made up of multiple control channel elements (CCEs). The number of CCEs used in each downlink system band depends on the downlink system bandwidth, the number of OFDM symbols making up the PDCCH, the number of physical resource blocks making up a potential region, discussed later, in which the second PDCCH may be placed, and the number of downlink reference signals in downlink pilot channels corresponding to the number of transmit antennas in the base station device 3 (or an RRH 4) used for transmission. As discussed later, the CCEs are made up of multiple downlink resource elements.

Figure 13:
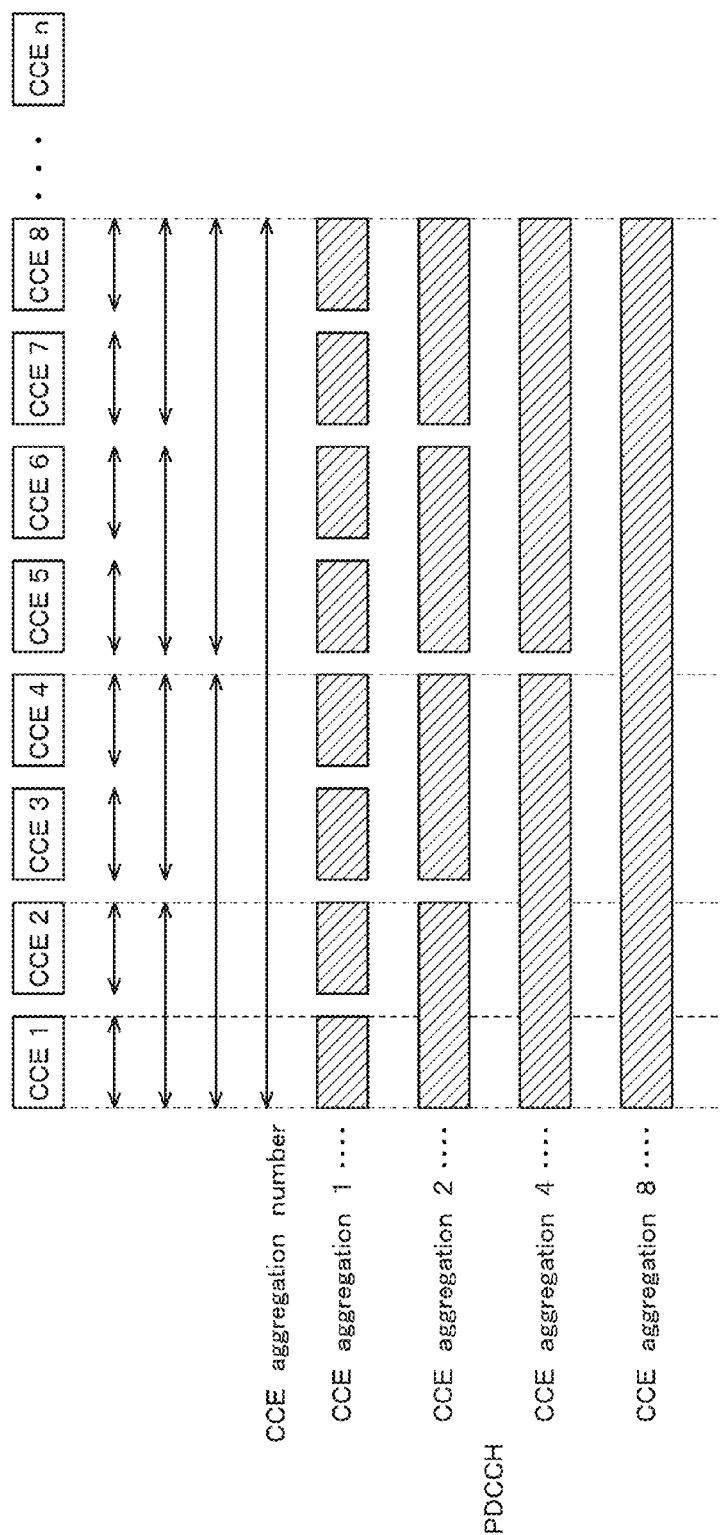
FIG. 13 is a diagram explaining logical relationships between PDCCHs (first PDCCH, second PDCCH) and CCEs in a communication system according to an embodiment of the present invention.

FIG. 13 is a diagram explaining logical relationships between PDCCHs (first PDCCH, second PDCCH) and CCEs in a communication system 1 according to an embodiment of the present invention. A CCE used between the base station device 3 (or an RRH 4) and a mobile station device 5 is given a number for identifying the CCE. CCE numbering is conducted on the basis of a predetermined rule. Herein, CCE t indicates the CCE with the CCE number t. A PDCCH is made up of an aggregation of multiple CCEs (a CCE aggregation). The number of CCEs making up this aggregation is hereinafter designated the "CCE aggregation number". The CCE aggregation number making up a PDCCH is set at the base station device 3 according to the code rate set in the PDCCH and/or the number of bits in the DCI included in the PDCCH. Also, an aggregation consisting of n CCEs is hereinafter designated "CCE aggregation n". For example, a PDCCH may be made up of one CCE (CCE aggregation 1), a PDCCH may be made up of two CCEs (CCE aggregation 2), a PDCCH may be made up of four CCEs (CCE aggregation 4), or a PDCCH may be made up of eight CCEs (CCE aggregation 8). For example, the base station device 3 uses a CCE aggregation number with a low number of CCEs making up a PDCCH for a mobile station device 5 with good channel quality, and uses a CCE aggregation number with a high number of CCEs making up a PDCCH for a mobile station device 5 with poor channel quality. As another example, the base station device 3 uses a CCE aggregation number with a low number of CCEs making up a PDCCH in the case of transmitting DCI with a small number of bits, and uses a CCE aggregation number with a high number of CCEs making up a PDCCH in the case of transmitting DCI with a large number of bits.

Figure 14:
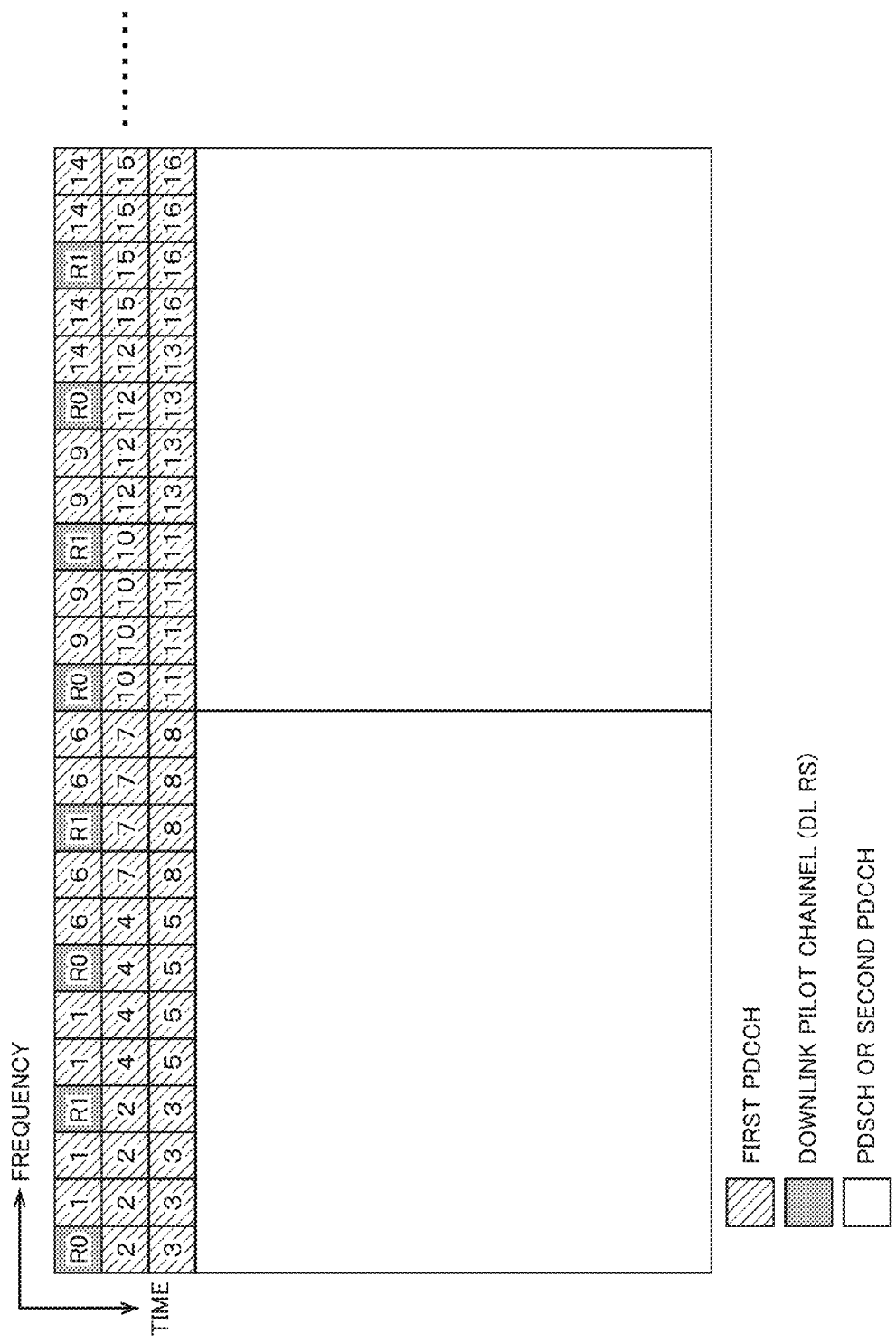
FIG. 14 is a diagram illustrating an example of resource element group placement in a downlink radio frame in a communication system according to an embodiment of the present invention.

The multiple downlink resource elements making up a CCE are made up of multiple resource element groups (REG, also designated mini-CCEs). A resource element group is made up of multiple downlink resource elements. For example, one resource element group is made up of four downlink resource elements. FIG. 14 is a diagram illustrating an example of resource element group placement in a downlink radio frame in a communication system 1 according to an embodiment of the present invention. Herein, resource element groups used in the first PDCCH will be illustrated, whereas illustration and description of unrelated portions (PDSCH, second PDCCH, second reference signal) will not be given. Herein is illustrated a case in which the first PDCCH is made up of the first to third OFDM symbols, and downlink reference signals (first reference signals) (R0, R1) corresponding to the downlink pilot channels of two transmit antennas (antenna port 0, antenna port 1) are placed. In this drawing, the vertical axis represents the frequency domain, while the horizontal axis represents the time domain.

In the exemplary placement in FIG. 14, one resource element group is made up of four downlink resource elements adjacent in the frequency domain. In FIG. 14, downlink resource elements given the same sign in the first PDCCH indicate belonging to the same resource element group. Note that resource element groups are made up by skipping the resource elements R0 (the downlink pilot channel signal on antenna port 0) and R1 (the downlink pilot channel signal on antenna port 1) in which a downlink pilot channel is placed. FIG. 14 illustrates how a number (the sign "1") is given to the resource element groups of the first OFDM symbol at the lowest frequency, a number (the sign "2") is given to the resource element groups of the second OFDM symbol at the next-lowest frequency, and a number (the sign "3") is next given to the resource element groups of the third OFDM symbol at the next-lowest frequency. Also, FIG. 14 illustrates how a number (the sign "4") is next given to the resource element groups adjacent in frequency to the numbered (the sign "2") resource element groups of the second OFDM symbol in which a downlink pilot channel is not placed, and a number (the sign "5") is next given to resource element groups adjacent in frequency to the numbered (the sign "3") resource element groups of the third OFDM symbol in which a downlink pilot channel is not placed. Additionally, FIG. 14 illustrates how a number (the sign "6") is given to resource element groups adjacent in frequency to the numbered (the sign "1") resource element groups of the first OFDM symbol, a number (the sign "7") is next given to the resource element groups adjacent in frequency to the numbered (the sign "4") resource element groups of the second OFDM symbol, and a number (the sign "8") is next given to resource element groups adjacent in frequency to the numbered (the sign "5") resource element groups of the third OFDM symbol. Subsequent resource element groups are similarly numbered.

Figure 15:
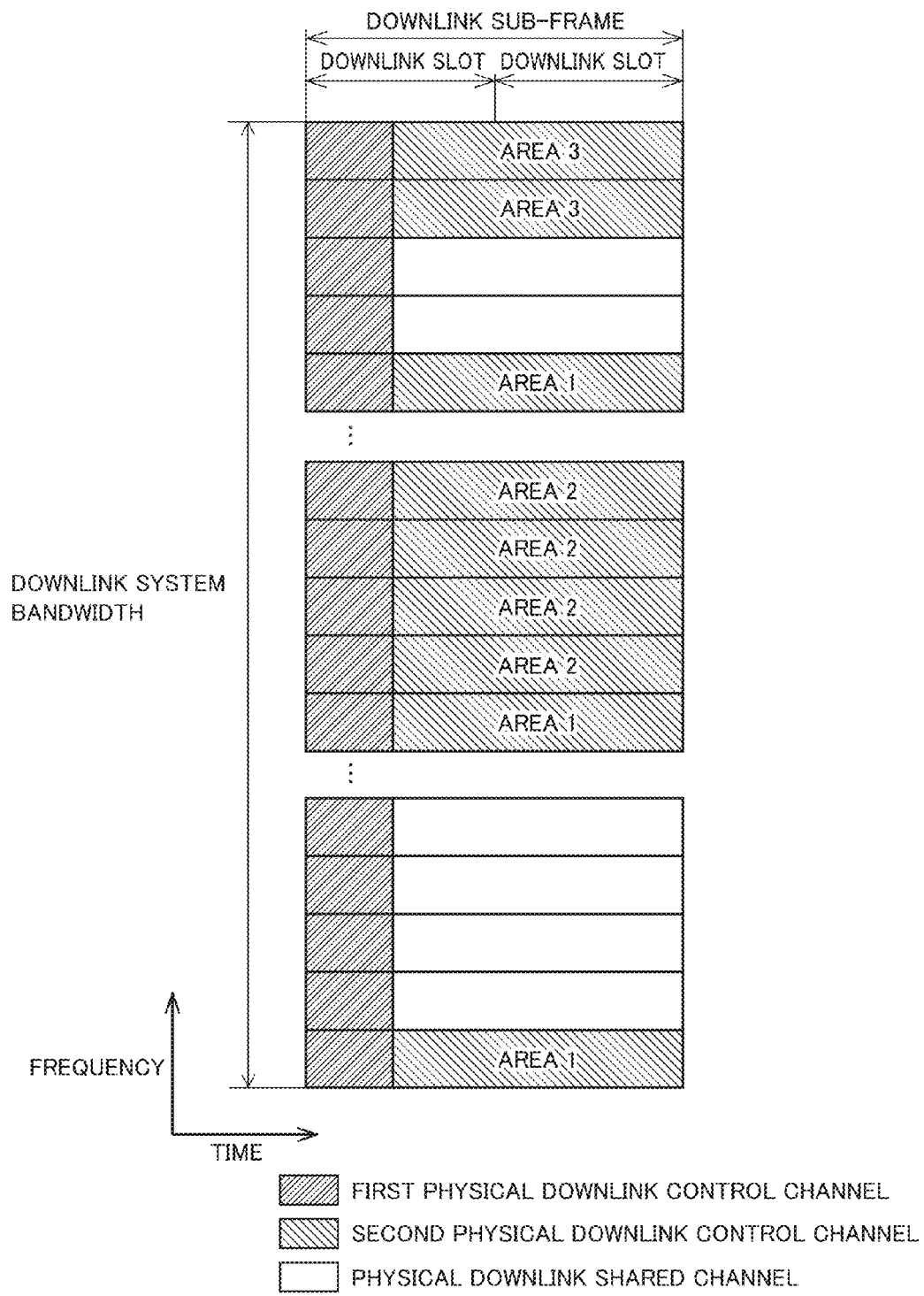
FIG. 15 is a diagram illustrating an example of a diagrammatic structure of a potential region in which a second PDCCH may be placed in a communication system according to an embodiment of the present invention.

FIG. 15 is a diagram illustrating an example of a diagrammatic structure of a potential region in which a second PDCCH may be placed (for the sake of simplicity, hereinafter designated a cooperative communication control channel region) in a communication system 1 according to an embodiment of the present invention. The base station device 3 is able to construct (set up, place) multiple cooperative communication control channel regions (region 1, region 2, region 3) within the downlink system band. One cooperative communication control channel region is made up of one or more physical resource block pairs. In the case in which one cooperative communication control channel region is made up of multiple physical resource block pairs, the cooperative communication control channel region may be made up of physical resource block pairs that are dispersed in the frequency domain, or made up of physical resource block pairs that are consecutive in the frequency domain. The base station device 3 is able to construct a cooperative communication control channel region for each cooperative communication group, or in other words, for each RRH 4 with which to cooperatively communicate. The base station device 3 applies a precoding process (beamforming process) independently to each cooperative communication control channel region. The same precoding process (beamforming process) is applied to a second reference signal within a cooperative communication control channel region. Note that the same precoding process (beamforming process) is applied to a second PDCCH and second reference signal transmitted within a cooperative communication control channel region. For example, if described using FIG. 9, the base station device 3 constructs an region 1 as a cooperative communication control channel region to be used in cooperation with the RRH 4A, constructs an region 2 as a cooperative communication control channel region to be used in cooperation with the RRH 4B, and constructs an region 3 as a cooperative communication control channel region to be used in cooperation with the RRH 4C.

A mobile station device 5 is specified (set up, configured) by the base station device 3 to conduct a process of detecting (monitoring) a second PDCCH in one of the cooperative communication control channel regions. The same cooperative communication control channel region is specified by the base station device 3 for a mobile station device group in the same cooperative communication group, or in other words, a mobile station device group that receives signals from the same RRH 4. Information related to this specification is exchanged between the base station device 3 and the mobile station devices 5 prior to starting the communication of data signals using cooperative communication. For example, such information is conducted using Radio Resource Control (RRC) signaling. Specifically, a mobile station device 5 receives information from the base station device 3 indicating the position (allocation) of the physical resources for that cooperative communication control channel. The mobile station device 5 averages estimated values for propagation channel variation estimated from each second reference signal received within the cooperative communication control channel region set by the base station device 3, and uses the averaged value to conduct a process of detecting a second PDCCH addressed to the device itself.

Figure 16:
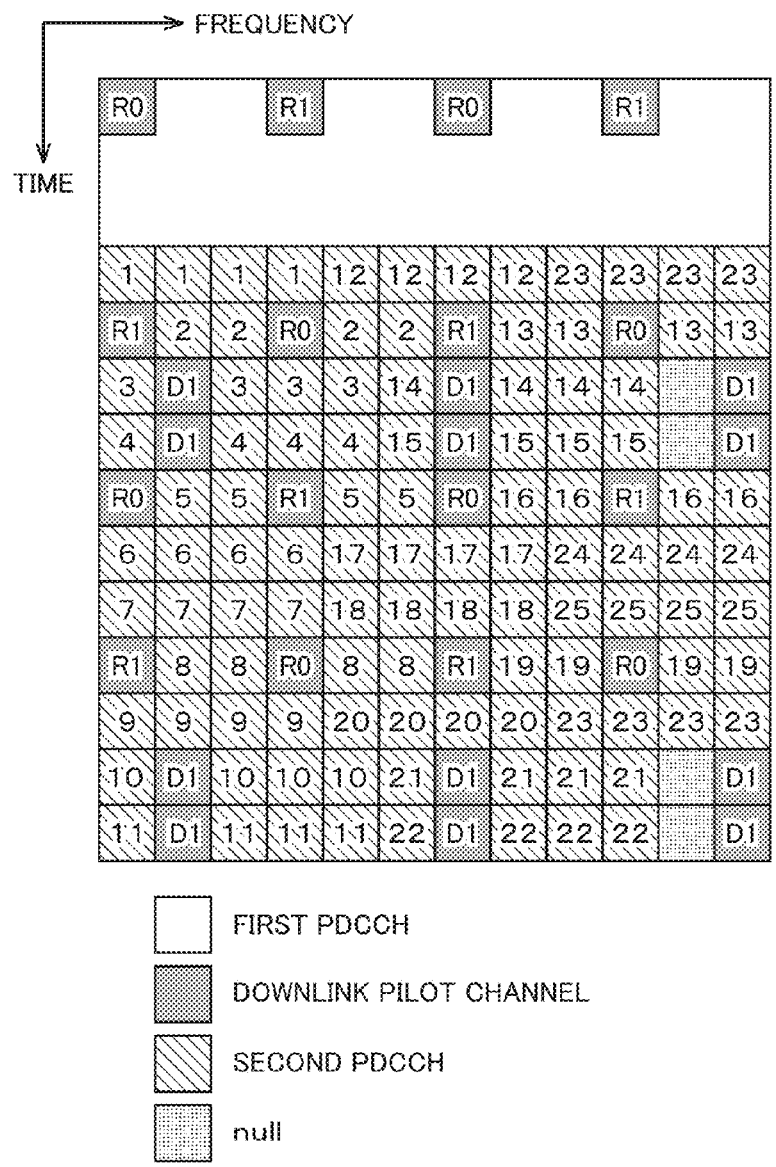
FIG. 16 is a diagram illustrating an example of resource element group placement in a downlink radio frame in a communication system according to an embodiment of the present invention.

FIG. 16 is a diagram illustrating an example of resource element group placement in a downlink radio frame in a communication system 1 according to an embodiment of the present invention. Herein, resource element groups used in the second PDCCH will be illustrated, whereas illustration and description of unrelated portions (PDSCH, first PDCCH) will not be given. Herein is illustrated a case in which the second PDCCH is made up of the fourth to fourteenth OFDM symbols, and first reference signals (R0, R1) for two transmit antennas (antenna port 0, antenna port 1) as well as a second reference signal (D1) for one transmit antenna (antenna port 7, not illustrated) are placed. In this drawing, the vertical axis represents the frequency domain, while the horizontal axis represents the time domain.

In the exemplary placement in FIG. 16, one resource element group is made up of four downlink resource elements that are basically close in the frequency domain. In FIG. 16, downlink resource elements given the same sign in the second PDCCH indicate belonging to the same resource element group. Note that resource element groups are made up by skipping the resource elements R0 (the downlink pilot channel signal on antenna port 0), R1 (the downlink pilot channel signal on antenna port 1), and D1 (the downlink pilot channel signal on antenna port 7) in which a downlink pilot channel is placed. A detailed description will not be given, resource element groups used in the second PDCCH are numbered similarly to the case of resource element groups used in the first PDCCH as illustrated in FIG. 14. Similar resource element group numbering is conducted in each physical resource block within a cooperative communication control channel region. A number is given to resource element groups within the physical resource block at the lowest frequency within the cooperative communication control channel region, and a number is given to resource element groups within the physical resource block at the next-lowest frequency. Note that no signal is placed in leftover downlink resource elements (null).

CCEs are made up of multiple resource element groups illustrated in FIGS. 14 and 16. For example, one CCE is made up of nine different resource element groups distributed in the frequency domain and the time domain. Specifically, in a CCE used in the first PDCCH, a block interleaver is used to interleave, in units of resource element groups, all resource element groups numbered as illustrated in FIG. 14 over the entire downlink system band, with one CCE being made up of nine consecutively numbered interleaved resource element groups. Specifically, in a CCE used in the second PDCCH, a block interleaver is used to interleave, in units of resource element groups, all resource element groups numbered as illustrated in FIG. 16 over one entire cooperative communication control channel region, with one CCE being made up of nine consecutively numbered interleaved resource element groups.

Hereinafter, a control signal mapped to the second PDCCH will be described. A control signal mapped to the second PDCCH is processed for each set of control information for one mobile station device 5, and similarly to a data signal, is subjected to a scrambling process, a modulating process, a layer mapping process, a precoding process, and the like. Herein, a layer mapping process means part of MIMO signal processing conducted in the case of applying multi-antenna transmission to the second PDCCH. Also, a control signal mapped to the second PDCCH is, together with the second reference signal, subjected to a precoding process unique to a mobile station device group (multiple mobile station devices conducting cooperative communication with the same RRH 4). At this point, the precoding process is preferably conducted with suitable precoding weights in units of mobile station device groups, or in other words, for each cooperative communication.

Also, the second PDCCH may be made up of only resource element groups within the front downlink slot in the downlink sub-frame. In this case, of the resource element groups used in the second PDCCH, only the resource element groups within the front downlink slot in the downlink sub-frame are numbered. In this case, in a CCE used in the second PDCCH, a block interleaver is used to interleave, in units of resource element groups, all resource element groups within one cooperative communication control channel region and within the front downlink slot in the downlink sub-frame, with one CCE being made up of consecutively numbered interleaved resource element groups. Also, the second PDCCH may be made up of only resource element groups within the rear downlink slot in the downlink sub-frame. In this case, of the resource element groups used in the second PDCCH, only the resource element groups within the rear downlink slot in the downlink sub-frame are numbered. In this case, in a CCE used in the second PDCCH, a block interleaver is used to interleave, in units of resource element groups, all resource element groups within one cooperative communication control channel region and within the rear downlink slot in the downlink sub-frame, with one CCE being made up of consecutively numbered interleaved resource element groups.

For example, a control signal including allocation information in the PDSCH of a data signal that the base station device 3 transmits to a mobile station device 5 (a downlink assignment) may be mapped to the front downlink slot in the downlink sub-frame. Also, a control signal including allocation information in the PUSCH of a data signal that a mobile station device 5 transmits to the base station device 3 (an uplink grant) may be mapped to the rear downlink slot in the downlink sub-frame. Note that a control signal including an uplink grant for the base station device 3 with respect to a mobile station device 5 may also be mapped to the front downlink slot in the downlink sub-frame, while a control signal including a downlink assignment for a mobile station device 5 with respect to the base station device 3 may be mapped to the rear downlink slot in the downlink sub-frame.

Also, the second reference signal is multiplexed by the base station device 3 in the physical resource blocks in which the second PDCCH is placed. A mobile station device 5 conducts a demodulation process on a signal of the second PDCCH with the second reference signal. Also, some or all of multiple antenna ports (antenna ports 7 to 14) may be used for the second PDCCH and the second reference signal. In the case of using multiple antenna ports, the base station device 3 is able to conduct MIMO transmission of a signal of the second PDCCH using multiple antenna ports.

For example, the second reference signal used to demodulate the second PDCCH is transmitted using a predefined antenna port and scrambling code. Specifically, the second reference signal used to demodulate the second PDCCH is generated using a predefined antenna port 7 and scrambling ID.

As another example, the second reference signal used to demodulate the second PDCCH may be generated using information indicating an antenna port and a scrambling ID announced via RRC signaling using the PDSCH or signaling using the PDCCH. Specifically, either the antenna port 7 or the antenna port 8 is announced via RRC signaling using the PDSCH or signaling using the PDCCH as information indicating the antenna port to use for the second reference signal used to demodulate the second PDCCH. A value of any from 0 to 3 is announced via RRC signaling using the PDSCH or signaling using the PDCCH as scrambling ID information used for the second reference signal used to demodulate the second PDCCH.

<Overall Configuration of Base Station Device 3>

Figure 1:
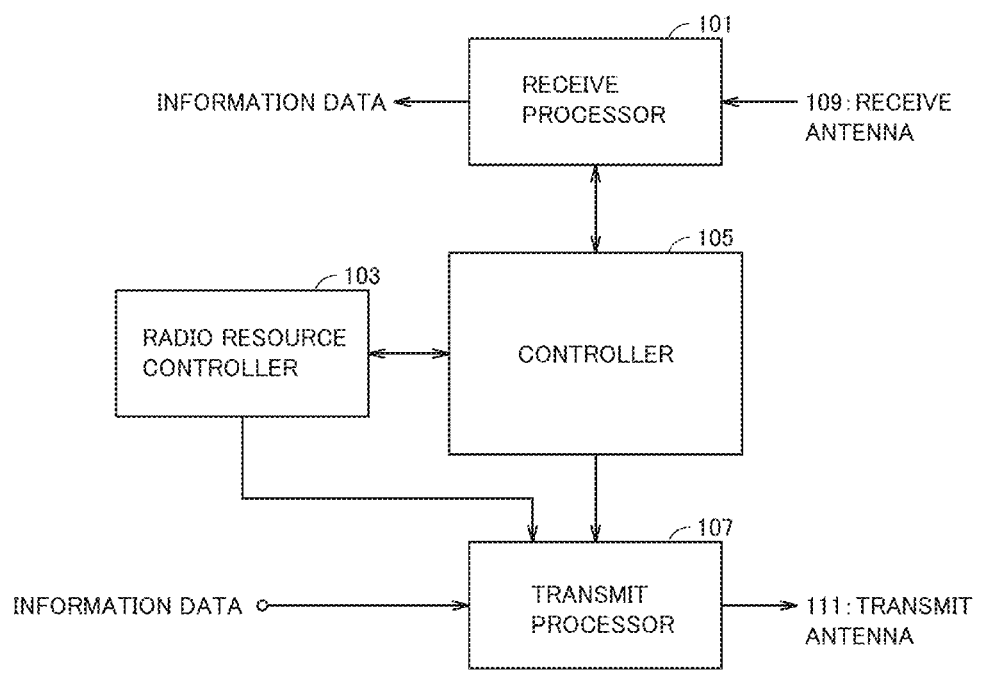
FIG. 1 is a schematic block diagram illustrating a configuration of a base station device according to an embodiment of the present invention.
Figure 2:
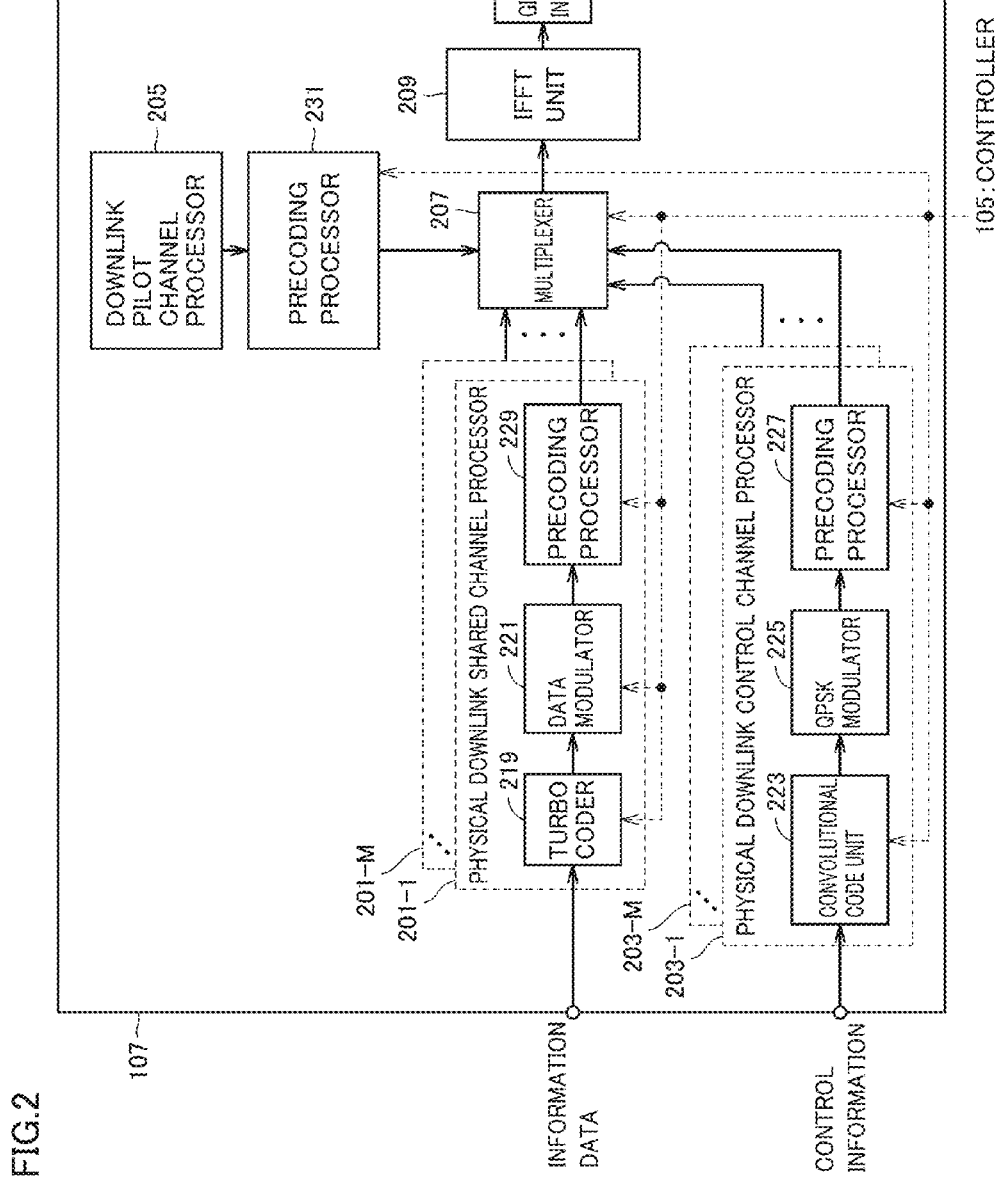
FIG. 2 is a schematic block diagram illustrating a configuration of a transmit processor in a base station device according to an embodiment of the present invention.
Figure 3:
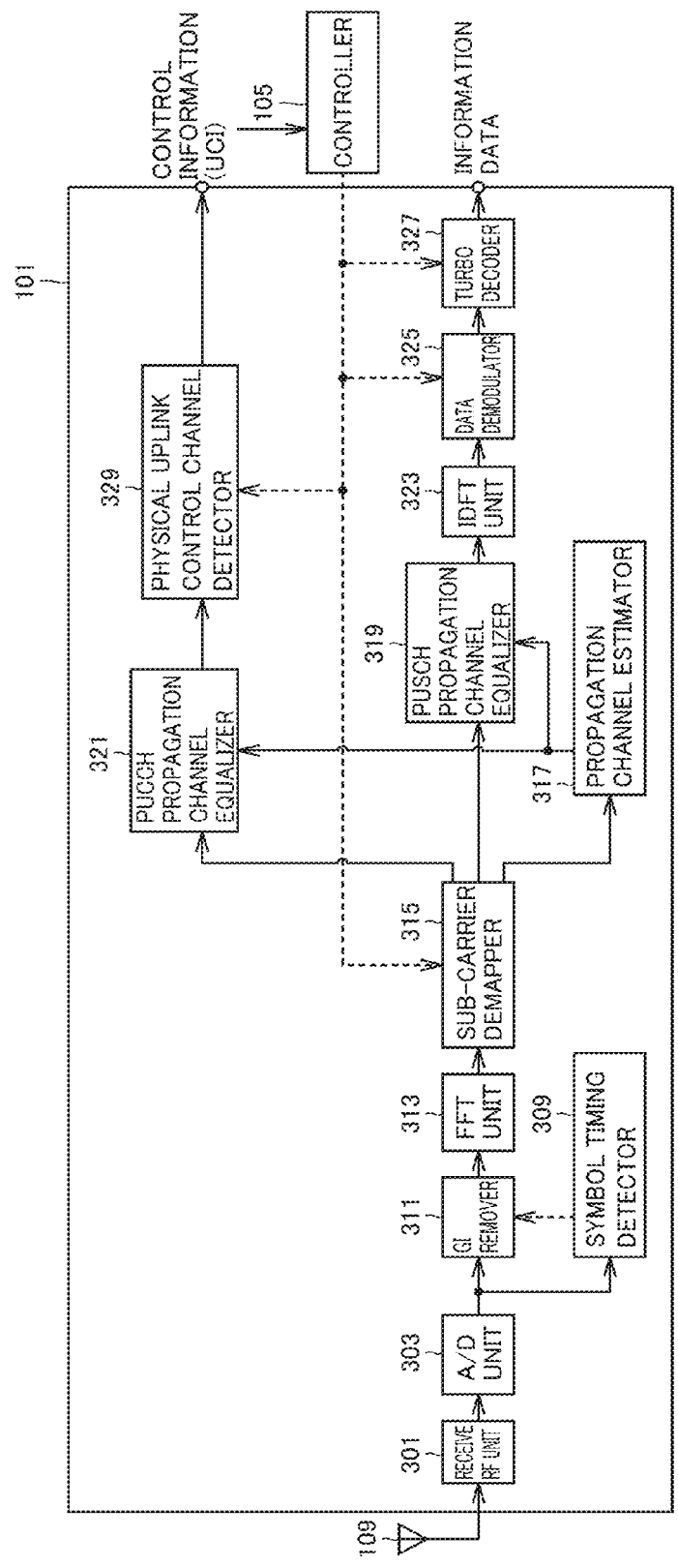
FIG. 3 is a schematic block diagram illustrating a configuration of a receive processor in a base station device according to an embodiment of the present invention.

Hereinafter, FIGS. 1, 2, and 3 will be used to describe a configuration of a base station device 3 according to the present embodiment. FIG. 1 is a schematic block diagram illustrating a configuration of a base station device 3 according to an embodiment of the present invention. As illustrated in this drawing, the base station device 3 is configured to include a receive processor 101, a radio resource controller 103, a controller (base station device controller) 105, and a transmit processor 107.

The receive processor 101, following instructions from the controller 105, uses an uplink reference signal to demodulate and decode a PUCCH and/or PUSCH receive signal received from a mobile station device 5 by a receive antenna 109, and extracts control information and/or information data. The receive processor 101 conducts a process of extracting UCI with respect to an uplink sub-frame and/or an uplink physical resource block in which the device itself allocated PUCCH resources to the mobile station device 5. The receive processor 101 is instructed by the controller 105 on how to process which uplink sub-frame or which uplink physical resource block. Also, the receive processor 101 is instructed by the controller 105 regarding a frequency domain code sequence and/or a time domain code sequence to use in a process of detecting UCI from the PUCCH. The receive processor 101 outputs extracted UCI to the controller 105, and outputs information data to a higher layer. The receive processor 101 will be later discussed in detail.

The radio resource controller 103 sets, for each of the mobile station devices 5, resource allocation to the PDCCHs (first PDCCH, second PDCCH), resource allocation to the PUCCH, downlink physical resource block allocation to the PDSCH, uplink physical resource block allocated to the PUSCH, various channel modulation schemes/code rates/transmit power control values/phase rotation magnitudes (weighting values) to use in the precoding process, phase rotation magnitudes (weighting values) to use in the precoding process of the second reference signal, and the like. Note that the radio resource controller 103 also sets frequency domain code sequences and time domain code sequences for the PUCCH and the like. Also, the radio resource controller 103 sets downlink physical resource blocks to use for the cooperative communication control channel region. Some of the information set by the radio resource controller 103 is announced to the mobile station devices 5 via the transmit processor 107. For example, information indicating the downlink physical resource blocks for the cooperative communication control channel region are announced to the mobile station devices 5.

Also, the radio resource controller 103 sets PDSCH radio resource allocation and the like on the basis of UCI acquired using the PUCCH in the receive processor 101, and input via the controller 105. For example, in the case in which an ACK/NACK acquired using the PUCCH is input, the radio resource controller 103 conducts the resource allocation for the PDSCH indicated by the ACK/NACK with respect to a mobile station device 5.

The radio resource controller 103 outputs various control signals to the controller 105. For example, a control signal is a control signal indicating second PDCCH resource allocation, or a control signal indicating a phase rotation magnitude to use in a precoding process.

The controller 105 performs controls with respect to the transmit processor 107 on the basis of a control signal input from the radio resource controller 103, such as allocating downlink physical resource blocks to the PDSCH, allocating resources to the PDCCH, setting a modulation scheme for the PDSCH, setting a code rate for the PDSCH and the PDCCH, and setting a precoding process for the PDSCH and PDCCH as well as the second reference signal. Also, on the basis of a control signal input from the radio resource controller 103, the controller 105 generates DCI transmitted using the PDCCH, and outputs the DCI to the transmit processor 107. Also, the controller 105 applies control to transmit information indicating a cooperative communication control channel region and the like to a mobile station device 5 using the PDSCH via the transmit processor 107.

The controller 105 performs controls with respect to the receive processor 101 on the basis of a control signal input from the radio resource controller 103, such as allocating uplink physical resource blocks to the PUSCH, allocating resources to the PUCCH, setting a modulation scheme for the PUSCH and the PUCCH, setting the code rate of the PUSCH, conducting a detection process with respect to the PUCCH, and setting a code sequence for the PUCCH. Also, the receive processor 101 inputs UCI transmitted by a mobile station device 5 using the PUCCH into the controller 105, which outputs the input UCI to the radio resource controller 103.

The transmit processor 107, on the basis of a control signal input from the controller 105, generates a signal to transmit using the PDCCH and PDSCH, and transmits the signal via a transmit antenna 111. The transmit processor 107 transmits information indicating a cooperative communication control channel region, information data input from a higher layer, and the like that was input from the radio resource controller 103 to a mobile station device 5 using the PDSCH, and transmits DCI input from the controller 105 to a mobile station device 5 using the PDCCHs (first PDCCH, second PDCCH). Also, the transmit processor 107 transmits a first reference signal and a second reference signal. Note that, for the sake of simplicity, hereinafter information data is assumed to include information related to multiple types of controls. The transmit processor 107 will be later discussed in detail.

<Configuration of Transmit Processor 107 in Base Station Device 3>

Hereinafter, the transmit processor 107 of the base station device 3 will be described in detail. FIG. 2 is a schematic block diagram illustrating a configuration of a transmit processor 107 in a base station device 3 according to an embodiment of the present invention. As illustrated in this drawing, the transmit processor 107 is configured to include multiple physical downlink shared channel processors 201-1 to 201-M (hereinafter, the physical downlink shared channel processors 201-1 to 201-M will be collectively designated the physical downlink shared channel processors 201), multiple physical downlink control channel processors 203-1 to 203-M (hereinafter, the physical downlink control channel processors 203-1 to 203-M will be collectively designated the physical downlink control channel processors 203), a downlink pilot channel processor 205, a precoding processor 231, a multiplexer 207, an inverse fast Fourier transform (IFFT) unit 209, a guard interval (GI) inserter 211, a digital/analog converter (D/A unit) 213, a transmit radio frequency (RF) unit 215, and a transmit antenna 111. Note that since each of the physical downlink shared channel processors 201 and each of the physical downlink control channel processors 203 respectively include similar configurations and functions, one will be described as a representative example. Note that, for the sake of simplicity, the transmit antenna 111 is taken to be a grouping of multiple antenna ports.

Also, as illustrated in the drawing, the physical downlink shared channel processors 201 respectively include a turbo coder 219, a data modulator 221, and a precoding processor 229. Also, as illustrated in the drawing, the physical downlink control channel processors 203 include a convolutional coder 223, a QPSK modulator 225, and a precoding processor 227. The physical downlink shared channel processors 201 conduct a baseband signal process in order to transmit information data to a mobile station device 5 according to an OFDM scheme. The turbo coder 219 conducts turbo coding according to a code rate input from the controller 105 on input information data in order to raise the error resistance of the data, and outputs to the data modulator 221. The data modulator 221 modulates data encoded by the turbo coder 219 according to a modulation scheme input from the controller 105, such as quadrature phase-shift keying (QPSK), 16 quadrature amplitude modulation (16QAM), or 64 quadrature amplitude modulation (64QAM), for example, and generates a signal sequence of modulation symbols. The data modulator 221 outputs the generated signal sequence to the precoding processor 229. The precoding processor 229 conducts a precoding process (beamforming process) on a signal input from the data modulator, and outputs to the multiplexer 207. Herein, the precoding process preferably applies a phase rotation or the like to the signal to generate, such that a mobile station device 5 is able to receive efficiently (for example, such that reception power is maximized, or interference is minimized).

The physical downlink control channel processors 203 conduct a baseband signal process in order to transmit DCI input from the controller 105 according to an OFDM scheme. The convolutional coder 223 conducts convolutional coding on the basis of a code rate input from the controller 105, in order to raise the error resistance of the DCI. Herein, DCI is controlled in units of bits. Also, the convolutional coder 223 conducts rate matching on the basis of a code rate input from the controller 105, in order to adjust the number of output bits with respect to bits subjected to the convolutional code process. The convolutional coder 223 outputs encoded DCI to the QPSK modulator 225. The QPSK modulator 225 modulates DCI encoded by the convolutional coder 223 according to a QPSK modulation scheme, and outputs a modulated signal sequence of modulation symbols to the precoding processor 227. The precoding processor 227 conducts a precoding process on a signal input from the QPSK modulator 225, and outputs to the multiplexer 207. The precoding processor 227 conducts a precoding process on a second PDCCH signal input from the QPSK modulator 225, outputs a first PDCCH signal to the multiplexer 207 without conducting a precoding process.

The downlink pilot channel processor 205 generates downlink reference signals (first reference signal, second reference signal), which are known signals to a mobile station device 5, and outputs to the precoding processor 231. The precoding processor 231 outputs a first reference signal input by the downlink pilot channel processor 205 to the multiplexer 207, without conducting a precoding process. The precoding processor 231 conducts a precoding process on a second reference signal input by the downlink pilot channel processor 205, and outputs to the multiplexer 207. The precoding processor 231 conducts a process on the second reference signal that is similar to the process conducted on the second PDCCH by the precoding processor 227. For this reason, in the case in which a second PDCCH signal to which is applied cooperative communication is demodulated at a mobile station device 5, an equivalent channel that the variation in the propagation channel (transmission channel) on the downlink and the phase rotation by the precoding processor 227 are mixed may be estimated for the second reference signal. In other words, the base station device 3 does not need to announce information (a phase rotation magnitude) about the precoding process by the precoding processor 227 to a mobile station device 5, and a mobile station device 5 is able to demodulate a signal subjected to the precoding process (transmitted by cooperative communication).

The multiplexer 207 multiplexes a signal input from the downlink pilot channel processor 205, a signal input from each of the physical downlink shared channel processors 201, and a signal input from each of the physical downlink control channel processors 203 into a downlink sub-frame, according to instructions from the controller 105. A control signal related to the allocation of physical resource blocks to the PDSCH and the allocation of resources to the PDCCHs (first PDCCH, second PDCCH) set by the radio resource controller 103 is input into the controller 105, and on the basis of the control signal, the controller 105 controls the processing by the multiplexer 207. The multiplexer 207 outputs a multiplexed signal to the IFFT unit 209.

The IFFT unit 209 applies an inverse fast Fourier transform to a signal multiplexed by the multiplexer 207, conducts modulation in an OFDM scheme, and outputs to the GI inserter 211. The GI inserter 211, by adding a guard interval to a signal modulated in an OFDM scheme by the IFFT unit 209, generates a baseband digital signal consisting of symbols in the OFDM scheme. As is commonly known, a guard interval is generated by duplicating part of the beginning or the end of the OFDM symbols to transmit. The GI inserter 211 outputs a generated baseband digital signal to the D/A unit 213. The D/A unit 213 converts a baseband digital signal input from the GI inserter 211 into an analog signal, and outputs to the transmit RF unit 215. The transmit RF unit 215 generates in-phase components and quadrature components of an intermediate frequency from an analog signal input from the D/A unit 213, and removes extra frequency components with respect to the intermediate frequency band. Next, the transmit RF unit 215 converts (upconverts) the signal of intermediate frequency into a signal of high frequency, removes extra frequency components, amplifies the power, and transmits to a mobile station device 5 via the transmit antenna 111.

<Configuration of Receive Processor 101 in Base Station Device 3>

Hereinafter, the receive processor 101 of the base station device 3 will be described in detail. FIG. 3 is a schematic block diagram illustrating a configuration of a receive processor 101 in a base station device 3 according to an embodiment of the present invention. As illustrated in the drawing, the receive processor 101 is configured to include a receive RF unit 301, an analog/digital converter (A/D unit) 303, a symbol timing detector 309, a GI remover 311, an FFT unit 313, a sub-carrier demapper 315, a propagation channel estimator 317, a PUCCH propagation channel equalizer 319, a PUCCH propagation channel equalizer 321, an IDFT unit 323, a data demodulator 325, a turbo decoder 327, and a physical uplink control channel detector 329.

The receive RF unit 301 suitably amplifies and converts (downconverts) a signal received by the receive antenna 109 to an intermediate frequency, removes unwanted frequency components, controls the amplification level such that the signal level is suitably maintained, and conducts quadrature demodulation on the basis of the in-phase components and quadrature components of the received signal. The receive RF unit 301 outputs a quadrature-demodulated analog signal to the A/D unit 303. The A/D unit 303 converts an analog signal quadrature-demodulated by the receive RF unit 301 into a digital signal, and outputs the converted digital signal to the symbol timing detector 309 and the GI remover 311.

The symbol timing detector 309, on the basis of a signal input by the A/D unit 303, detects symbol timings, and outputs a control signal indicating the detected timings of symbol boundaries to the GI remover 311. The GI remover 311, on the basis of a control signal from the symbol timing detector 309, removes the portion corresponding to the guard interval from a signal input by the A/D unit 303, and outputs the signal of the remaining portion to the FFT unit 313. The FFT unit 313 applies a fast Fourier transform to a signal input from the GI remover 311, conducts demodulation in a DFT-Spread OFDM scheme, and outputs to the sub-carrier demapper 315. Note that the number of points in the FFT unit 313 is equal to the number of points in the IFFT unit of a mobile station device 5 discussed later.

The sub-carrier demapper 315, on the basis of a control signal input from the controller 105, demultiplexes a signal demodulated by the FFT unit 313 into the uplink reference signal on an uplink pilot channel, a PUSCH signal, and a PUCCH signal. The sub-carrier demapper 315 outputs the demultiplexed uplink reference signal to the propagation channel estimator 317, outputs the demultiplexed PUSCH signal to the PUSCH propagation channel equalizer 319, and outputs the demultiplexed PUCCH signal to the PUCCH propagation channel equalizer 321.

The propagation channel estimator 317 estimates propagation channel variation using the uplink reference signal demultiplexed by the sub-carrier demapper 315, and a known signal. The propagation channel estimator 317 outputs estimated propagation channel estimation values to the PUSCH propagation channel equalizer 319 and the PUCCH propagation channel equalizer 321. The PUSCH propagation channel equalizer 319 equalizes the amplitude and phase of the PUSCH signal demultiplexed by the sub-carrier demapper 315 on the basis of propagation channel estimation values input from the propagation channel estimator 317. Herein, equalization refers to a process of reverting the propagation channel variation imparted to a signal during radio communication. The PUSCH propagation channel equalizer 319 outputs an adjusted signal to the IDFT unit 323.

The IDFT unit 323 applies an inverse discrete Fourier transform to a signal input from the PUSCH propagation channel equalizer 319, and outputs to the data demodulator 325. The data demodulator 325 demodulates a PUSCH signal converted by the IDFT unit 323, and outputs a demodulated signal to the turbo decoder 327. This demodulation is a demodulation corresponding to the modulation scheme used by the data modulator of a mobile station device 5. The modulation scheme is input by the controller 105. The turbo decoder 327 decodes information data from a demodulated PUSCH signal input from the data demodulator 325. The code rate is input by the controller 105.

The PUCCH propagation channel equalizer 321 equalizes the amplitude and phase of the PUCCH signal demultiplexed by the sub-carrier demapper 315 on the basis of propagation channel estimation values input from the propagation channel estimator 317. The PUCCH propagation channel equalizer 321 outputs an equalized signal to the physical uplink control channel detector 329.

The physical uplink control channel detector 329 demodulates and decodes a signal input from the PUCCH propagation channel equalizer 321, and detects UCI. The physical uplink control channel detector 329 conducts a process of demultiplexing signals that have been code-division multiplexed in the frequency domain and/or the time domain. The physical uplink control channel detector 329 conducts a process for detecting an ACK/NACK, SR, and CQI from PUCCH signals that have been code-division multiplexed in the frequency domain and/or the time domain using code sequences used on the transmitting side. Specifically, as a detection process using a code sequence in the frequency domain, or in other words as a process of demultiplexing signals that have been code-division multiplexed in the frequency domain, the physical uplink control channel detector 329 multiplies each code in the code sequence by a signal for each PUCCH sub-carrier, and then combines the signals in which each code is multiplied. Specifically, as a detection process using a code sequence in the time domain, or in other words as a process of demultiplexing signals that have been code-division multiplexed in the time domain, the physical uplink control channel detector 329 multiplies each code in the code sequence by a signal for each PUCCH SC-FDMA symbol, and then combines the signals in which each code is multiplied. Note that the physical uplink control channel detector 329 sets a detection process for a PUCCH signal on the basis of a control signal from the controller 105.

The controller 105 controls the sub-carrier demapper 315, the data demodulator 325, the turbo decoder 327, the propagation channel estimator 317, and the physical uplink control channel detector 329 on the basis of control information (DCI) transmitted using the PDCCH, as well as control information (RRC signaling) transmitted using the PDSCH, by the base station device 3 to a mobile station device 5.

Also, on the basis of control information transmitted by the base station device 3 to a mobile station device 5, the controller 105 knows which resources (uplink sub-frames, uplink physical resource blocks, frequency domain code sequences, time domain code sequences) make up the PUSCH and PUCCH transmitted by each mobile station device 5.

<Overall Configuration of Mobile Station Device 5>

Figure 4:
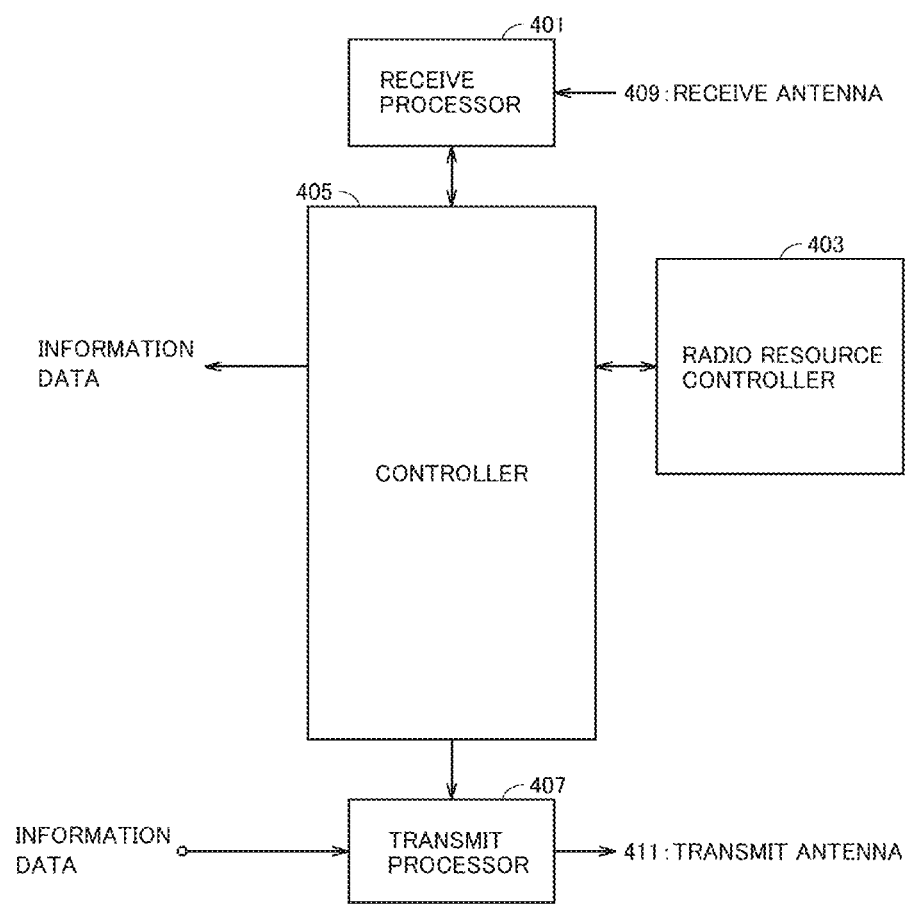
FIG. 4 is a schematic block diagram illustrating a configuration of a mobile station device according to an embodiment of the present invention.
Figure 5:
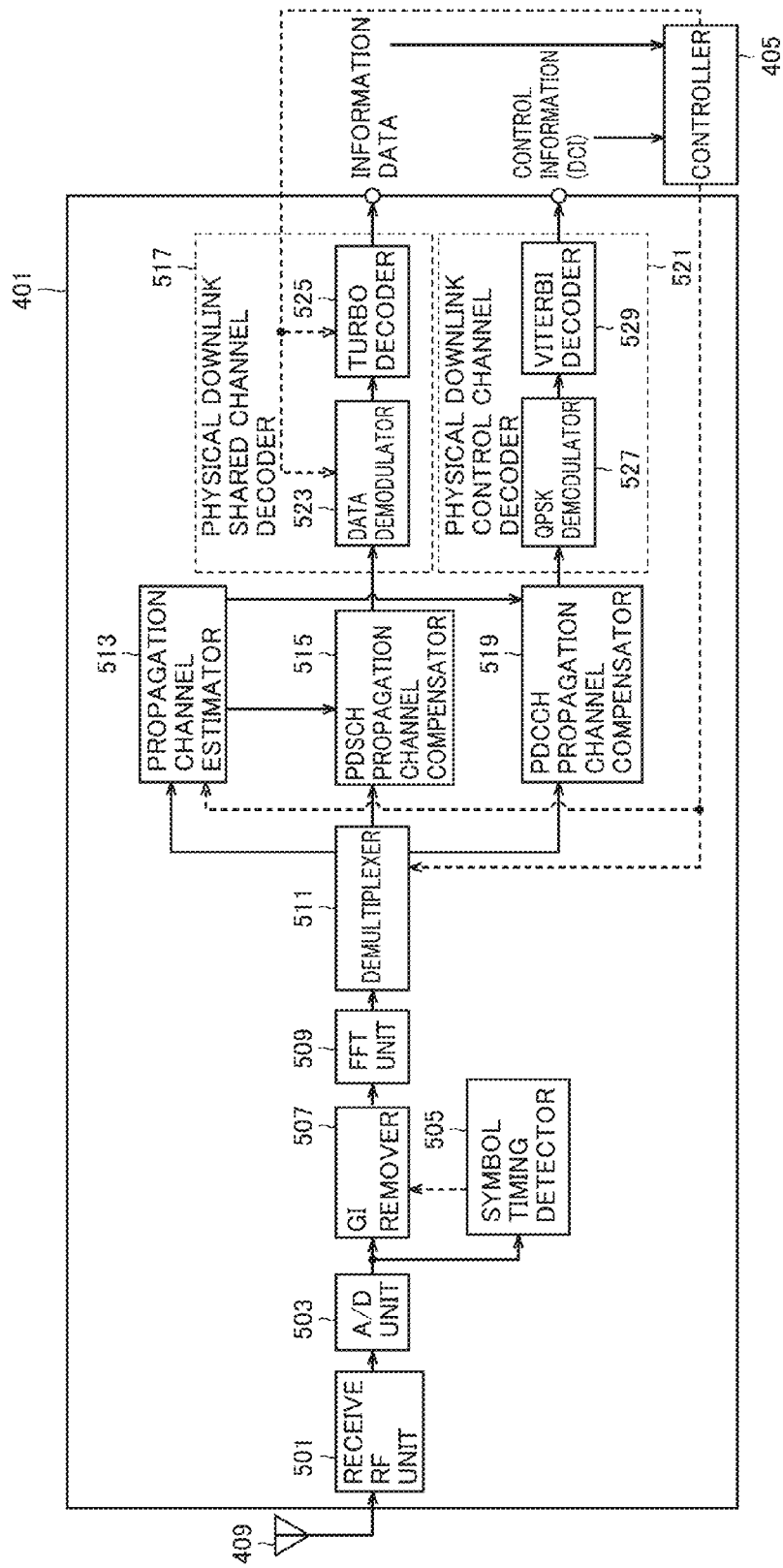
FIG. 5 is a schematic block diagram illustrating a configuration of a receive processor in a mobile station device according to an embodiment of the present invention.

Hereinafter, FIGS. 4, 5, and 6 will be used to describe a configuration of a mobile station device 5 according to the present embodiment. FIG. 4 is a schematic block diagram illustrating a configuration of a mobile station device 5 according to an embodiment of the present invention. As illustrated in this drawing, the mobile station device 5 is configured to include a receive processor 401, a radio resource controller 403, a controller (mobile station device controller) 405, and a transmit processor 407.

The receive processor 401 receives a signal from the base station device 3, and demodulates and decodes a reception signal according to instructions from the controller 405. In the case of detecting a PDCCH (first PDCCH, second PDCCH) signal addressed to the device itself, the receive processor 401 decodes the PDCCH signal and outputs acquired DCI to the controller 405. For example, the receive processor 401 conducts a process of detecting a second PDCCH addressed to the device itself within a cooperative communication control channel region specified by the base station device 3. For example, the receive processor 401 conducts propagation channel estimation using a second reference signal within a cooperative communication control channel region specified by the base station device 3, and conducts an averaging process on propagation channel estimation values estimated using multiple second reference signals within the cooperative communication control channel region. The receive processor 401 demodulates the second PDCCH signal using the averaged propagation channel estimation values, and conducts a process of detecting a signal that includes control information addressed to the device itself. Also, on the basis of instructions from the controller 405 after DCI included in the PDCCH is output to the controller 405, the receive processor 401 outputs information data obtained by decoding the PDSCH addressed to the device itself to an upper layer via the controller 405. A downlink assignment in DCI included in the PDCCH includes information indicating PDSCH resource allocation. Also, the receive processor 401 outputs, to the controller 405, control information generated by the radio resource controller 103 of the base station device 3 and obtained by decoding the PDSCH, and also outputs to the radio resource controller 403 of the device itself via the controller 405. For example, control information generated by the radio resource controller 103 of the base station device 3 includes information indicating the physical resource blocks of a cooperative communication control channel region.

Also, the receive processor 401 outputs a cyclic redundancy check (CRC) code included in the PDSCH to the controller 405. Although not mentioned in the description of the base station device 3, the transmit processor 107 of the base station device 3 generates a CRC code from information data, and transmits the information data and the CRC code on the PDSCH. The CRC code is used to determine whether the data included in the PDSCH has errors or not. For example, the data is determined to be error-free in the case in which information generated from data using a predetermined generator polynomial at a mobile station device 5 is the same as a CRC code generated at the base station device 3 and transmitted on the PDSCH, whereas the data is determined to have errors in the case in which information generated from data using a predetermined generator polynomial at a mobile station device 5 is different from a CRC code generated at the base station device 3 and transmitted on the PDSCH. The receive processor 401 will be later discussed in detail.

The controller 405 checks data transmitted from the base station device 3 using the PDSCH and input by the receive processor 401, outputs information data among the data to a higher layer, and controls the receive processor 401 and the transmit processor 407 on the basis of control information among the data that has been generated by the radio resource controller 103 of the base station device 3. The controller 405 also controls the receive processor 401 and the transmit processor 407 on the basis of instructions from the radio resource controller 403. For example, the controller 405 controls the receive processor 401 to conduct a process of detecting the second PDCCH with respect to a signal within physical resource blocks of a cooperative communication control channel region specified by the radio resource controller 403. The controller 405 also controls the receive processor 401 and the transmit processor 407 on the basis of DCI transmitted from the base station device 3 using the PDCCH, and input by the receive processor 401. Specifically, the controller 405 controls the receive processor 401 primarily on the basis of a detected downlink assignment, and controls the transmit processor 407 primarily on the basis of a detected uplink grant. The controller 405 also controls the transmit processor 407 on the basis of control information indicating transmit power control commands in the PUCCH included in a downlink assignment. The controller 405 compares information generated using a predetermined generator polynomial from data input by the receive processor 401 against a CRC code input by the receive processor 401, determines whether or not the data has errors, and generates an ACK/NACK. Also, the controller 405 generates an SR and CQI on the basis of instructions from the radio resource controller 403.

The radio resource controller 403 stores and holds control information generated by the radio resource controller 103 of the base station device 3 and announced by the base station device 3, while also doing control over the receive processor 401 and the transmit processor 407 via the controller 405. In other words, the radio resource controller 403 includes a memory function that holds various parameters or the like. The radio resource controller 403 holds parameters related to the transmission power of the PUSCH and the PUCCH, and outputs a control signal to the controller 405 so as to use parameters announced by the base station device 3.

The radio resource controller 403 sets the values of parameters related to transmission power of the PUCCH, the PUSCH, the uplink pilot channel, and the like. Transmission power values set in the radio resource controller 403 are output to the transmit processor 407 by the controller 405. Note that the uplink pilot channel made up of a resource within the same uplink physical resource blocks as the PUCCH is subjected to the same transmit power control as the PUCCH. Note that the uplink pilot channel made up of a resource within the same uplink physical resource blocks as the PUSCH is subjected to the same transmit power control as the PUSCH. With respect to the PUSCH, the radio resource controller 403 sets values such as parameters based on the number of uplink physical resource blocks allocated to the PUSCH, cell-specific and mobile station device-specific parameters announced in advance by the base station device 3, parameters based on the modulation scheme used for the PUSCH, parameters based on estimated path loss values, and parameters based on transmit power control commands announced by the base station device 3. With respect to the PUCCH, the radio resource controller 403 sets values such as parameters based on the PUCCH signal structure, cell-specific and mobile station device-specific parameters announced in advance by the base station device 3, parameters based on estimated path loss values, and parameters based on announced transmit power control commands.

Note that for parameters related to transmission power, cell-specific and mobile station device-specific parameters are announced by the base station device 3 using the PDSCH, while transmit power control commands are announced by the base station device 3 using the PDCCH. Transmit power control commands with respect to the PUSCH are included in an uplink grant, while transmit power control commands with respect to the PUCCH are included in a downlink assignment. Note that the various parameters related to transmission power announced by the base station device 3 are stored in the radio resource controller 403 as appropriate, and the stored values are input into the controller 405.

The transmit processor 407, following instructions from the controller 405, uses PUSCH and PUCCH resources to transmit a signal in which information data and/or UCI is encoded and modulated to the base station device 3 via a transmit antenna 411. The transmit processor 407 also sets the transmission power of the PUSCH and/or the PUCCH, following instructions from the controller 405. For example, the transmit processor 407 generates a signal obtained by encoding and modulating a signal indicating the content of a reception acknowledgement, sets the transmission power to a value input by the radio resource controller 403, and uses PUCCH resources to transmit the signal via the transmit antenna 411. The transmit processor 407 will be later discussed in detail.

<Receive Processor 401 in Mobile Station Device 5>

Hereinafter, the receive processor 401 of a mobile station device 5 will be described in detail. FIG. 5 is a schematic block diagram illustrating a configuration of a receive processor 401 in a mobile station device 5 according to an embodiment of the present invention. As illustrated in the drawing, the receive processor 401 is configured to include a receive RF unit 501, an A/D unit 503, a symbol timing detector 505, a GI remover 507, an FFT unit 509, a demultiplexer 511, a propagation channel estimator 513, a PDSCH propagation channel compensator 515, a physical downlink shared channel decoder 517, a PDCCH propagation channel compensator 519, and a physical downlink control channel decoder 521. Also, as illustrated in the drawing, the physical downlink shared channel decoder 517 is equipped with a data demodulator 523 and a turbo decoder 525. Also, as illustrated in the drawing, the physical downlink control channel decoder 521 includes a QPSK demodulator 527 and a Viterbi decoder 529.

The receive RF unit 501 suitably amplifies and converts (downconverts) a signal received by a receive antenna 409 to an intermediate frequency, removes unwanted frequency components, controls the amplification level such that the signal level is suitably maintained, and conducts quadrature demodulation on the basis of the in-phase components and quadrature components of the received signal. The receive RF unit 501 outputs a quadrature-demodulated analog signal to the A/D unit 503.

The A/D unit 503 converts an analog signal quadrature-demodulated by the receive RF unit 501 into a digital signal, and outputs the converted digital signal to the symbol timing detector 505 and the GI remover 507. The symbol timing detector 505, on the basis of a digital signal converted by the A/D unit 503, detects symbol timings, and outputs a control signal indicating the detected timings of symbol boundaries to the GI remover 507. The GI remover 507, on the basis of a control signal from the symbol timing detector 505, removes the portion corresponding to the guard interval from a digital signal output from the A/D unit 503, and outputs the signal of the remaining portion to the FFT unit 509. The FFT unit 509 applies a fast Fourier transform to a signal input from the GI remover 507, conducts demodulation in an OFDM scheme, and outputs to the demultiplexer 511.

The demultiplexer 511, on the basis of a control signal input from the controller 405, demultiplexes a signal demodulated by the FFT unit 509 into a PDCCH (first PDCCH, second PDCCH) signal and a PDSCH signal. The demultiplexer 511 outputs the demultiplexed PDSCH signal to the PDSCH propagation channel compensator 515, and outputs the demultiplexed PDCCH signal to the PDCCH propagation channel compensator 519. For example, the demultiplexer 511 outputs the second PDCCH signal of a cooperative communication control channel region specified for the device itself to the PDCCH propagation channel compensator 519. Also, the demultiplexer 511 demultiplexes a downlink resource element in which a downlink pilot channel is placed, and outputs a downlink reference signal (first reference signal, second reference signal) on the downlink pilot channel to the propagation channel estimator 513. For example, the demultiplexer 511 outputs the second reference signal of a cooperative communication control channel region specified for the device itself to the propagation channel estimator 513.

The propagation channel estimator 513 estimates propagation channel variation using a downlink reference signal on the downlink pilot channel demultiplexed by the demultiplexer 511, and a known signal, and outputs propagation channel compensation values for adjusting the amplitude and phase to compensate for the propagation channel variation to the PDSCH propagation channel compensator 515 and the PDCCH propagation channel compensator 519. The propagation channel estimator 513 independently estimates propagation channel variation and outputs propagation channel compensation values using the first reference signal and the second reference signal, respectively. For example, the propagation channel estimator 513 conducts an averaging process on propagation channel estimation values using multiple second reference signals placed in multiple downlink physical resource blocks within a cooperative communication control channel region specified for the device itself, generates a propagation channel compensation value, and outputs to the PDCCH propagation channel compensator 519. For example, the propagation channel estimator 513 conducts an averaging process on propagation channel estimation values using multiple second reference signals placed in multiple downlink physical resource blocks allocated to the PDSCH allocated to the device itself and transmitted using cooperative communication, generates a propagation channel compensation value, and outputs to the PDSCH propagation channel compensator 515. The propagation channel estimator 513 conducts the process of averaging propagation channel estimation values using second reference signals independently for the second PDCCH and the PDSCH. For example, the propagation channel estimator 513 conducts an averaging process on propagation channel estimation values estimated using the second reference signals placed in all downlink physical resource blocks within a cooperative communication control channel region, and uses a value obtained by the averaging process to demodulate the second PDCCH. For example, the propagation channel estimator 513 conducts an averaging process on propagation channel estimation values estimated using the second reference signals placed in every physical resource block of a predetermined number (every two, for example) with respect to multiple downlink physical resource blocks allocated to the PDSCH, and uses a value obtained by the averaging process to demodulate the PDSCH. In other words, the propagation channel estimator 513 sets the units of the process of averaging propagation channel estimation values using second reference signals independently with respect to the second PDCCH and the PDSCH. For example, the units of the averaging process with respect to the second PDCCH are the physical resource blocks of the entire cooperative communication control channel region, while the units of the averaging process with respect to the PDSCH are two physical resource blocks. Note that in the base station device 3, a common precoding process is conducted within a cooperative communication control channel region with respect to the second PDCCH and a second reference signal placed in the same physical resource block as the second PDCCH, a common precoding process is conducted within a predetermined number of consecutive physical resource blocks in the frequency domain with respect to the PDSCH and a second reference signal placed in the same physical resource block as the PDSCH, and a precoding process is independently conducted with respect to the PDSCH and a second reference signal distanced by a predetermined number of physical resource blocks.

The PDSCH propagation channel compensator 515 adjusts the amplitude and phase of the PDSCH signal demultiplexed by the demultiplexer 511, according to a propagation channel compensation value input from the propagation channel estimator 513. For example, the PDSCH propagation channel compensator 515 adjusts a PDSCH signal transmitted using cooperative communication according to a propagation channel compensation value generated on the basis of a second reference signal by the propagation channel estimator 513, and adjusts a PDSCH signal transmitted without using cooperative communication according to a propagation channel estimation value generated on the basis of a first reference signal by the propagation channel estimator 513. The PDSCH propagation channel compensator 515 outputs a signal with an adjusted propagation channel to the data demodulator 523 of the physical downlink shared channel decoder 517.

The physical downlink shared channel decoder 517 demodulates and decodes the PDSCH on the basis of instructions from the controller 405, and detects information data. The data demodulator 523 demodulates a PDSCH signal input from the PDSCH propagation channel compensator 515, and outputs a demodulated PDSCH signal to the turbo decoder 525. This demodulation is a demodulation corresponding to the modulation scheme used by the data modulator 221 of the base station device 3. The turbo decoder 525 decodes information data from a demodulated PDSCH signal input from the data demodulator 523, and outputs to a higher layer via the controller 405. Note that control information and the like generated by the radio resource controller 103 of the base station device 3 and transmitted using the PDSCH is also output to the controller 405, and additionally output to the radio resource controller 403 via the controller 405. Note that a CRC code included in the PDSCH is also output to the controller 405.

The PDCCH propagation channel compensator 519 adjusts the amplitude and phase of the PDCCH signal demultiplexed by the demultiplexer 511, according to a propagation channel compensation value input from the propagation channel estimator 513. For example, the PDCCH propagation channel compensator 519 adjusts a second PDCCH signal according to a propagation channel compensation value generated on the basis of a second reference signal by the propagation channel estimator 513, and adjusts a first PDCCH signal according to a propagation channel estimation value generated on the basis of a first reference signal by the propagation channel estimator 513. The PDCCH propagation channel compensator 519 outputs an adjusted signal to the QPSK demodulator 527 of the physical downlink control channel decoder 521.

As below, the physical downlink control channel decoder 521 demodulates and decodes a signal input from the PDCCH propagation channel compensator 519, and detects control data. The QPSK demodulator 527 conducts QPSK demodulation on a PDCCH signal, and outputs to the Viterbi decoder 529. The Viterbi decoder 529 decodes a signal demodulated by the QPSK demodulator 527, and outputs decoded DCI to the controller 405. At this point, this signal is expressed in units of bits, and the Viterbi decoder 529 also conducts rate matching in order to adjust the number of bits on which to conduct a Viterbi decoding process versus the input bits.

A mobile station device 5 supposes multiple CCE aggregation numbers, and conducts a process of detecting DCI addressed to the device itself. The mobile station device 5 conducts a different decoding process on a PDCCH signal for every supposed CCE aggregation number (code rate), and acquires DCI included in the PDCCH for which no error is detected in the CRC code attached to the PDCCH together with the DCI. Such a process is designated blind decoding. Note that a mobile station device 5 may also conduct blind decoding on only some of the CCEs, rather than conducting blind decoding that assumes the first PDCCH with respect to the signals (reception signals) of all CCEs (REGs) in the downlink system band. Note that a mobile station device 5 may also conduct blind decoding on only some of the CCEs, rather than conducting blind decoding that assumes the second PDCCH with respect to the signals (reception signals) of all CCEs (REGs) in the cooperative communication control channel region. The partial CCE (CCEs) to blind decode is designated the search space. Also, a different search space may also be defined for every CCE aggregation number. In the communication system 1 of an embodiment of the present invention, respectively different search spaces are set in a mobile station device 5 with respect to the first PDCCH and the second PDCCH. The search space with respect to the second PDCCH in a mobile station device 5 is made up of partial CCE (CCEs) (resources) in cooperative communication control channel region. In other words, the search space with respect to the second PDCCH in each mobile station device 5 of a mobile station device group for which cooperative communication is conducted using the same RRH 4 is made up of partial CCEs in the same cooperative communication control channel region. Herein, the search space with respect to the second PDCCH of each mobile station device 5 may be made up of completely different CCE (CCEs), may be made up of exactly the same CCE (CCEs), or may be made up of partially overlapping CCE (CCEs).

Note that the controller 405 determines if DCI input by the Viterbi decoder 529 is error-free and also DCI addressed to the device itself, and in the case of determining that the DCI is error-free and also addressed to the device itself, controls the demultiplexer 511, the data demodulator 523, the turbo decoder 525, and the transmit processor 407 on the basis of the DCI. For example, in the case in which the DCI is a downlink assignment, the controller 405 controls the receive processor 401 to decode the PDSCH signal. Note that a CRC code is likewise included in the PDCCH similarly to the PDSCH, and the controller 405 uses the CRC code to determine whether or not the DCI of the PDCCH has errors.

<Transmit Processor 407 in Mobile Station Device 5>

Figure 6:
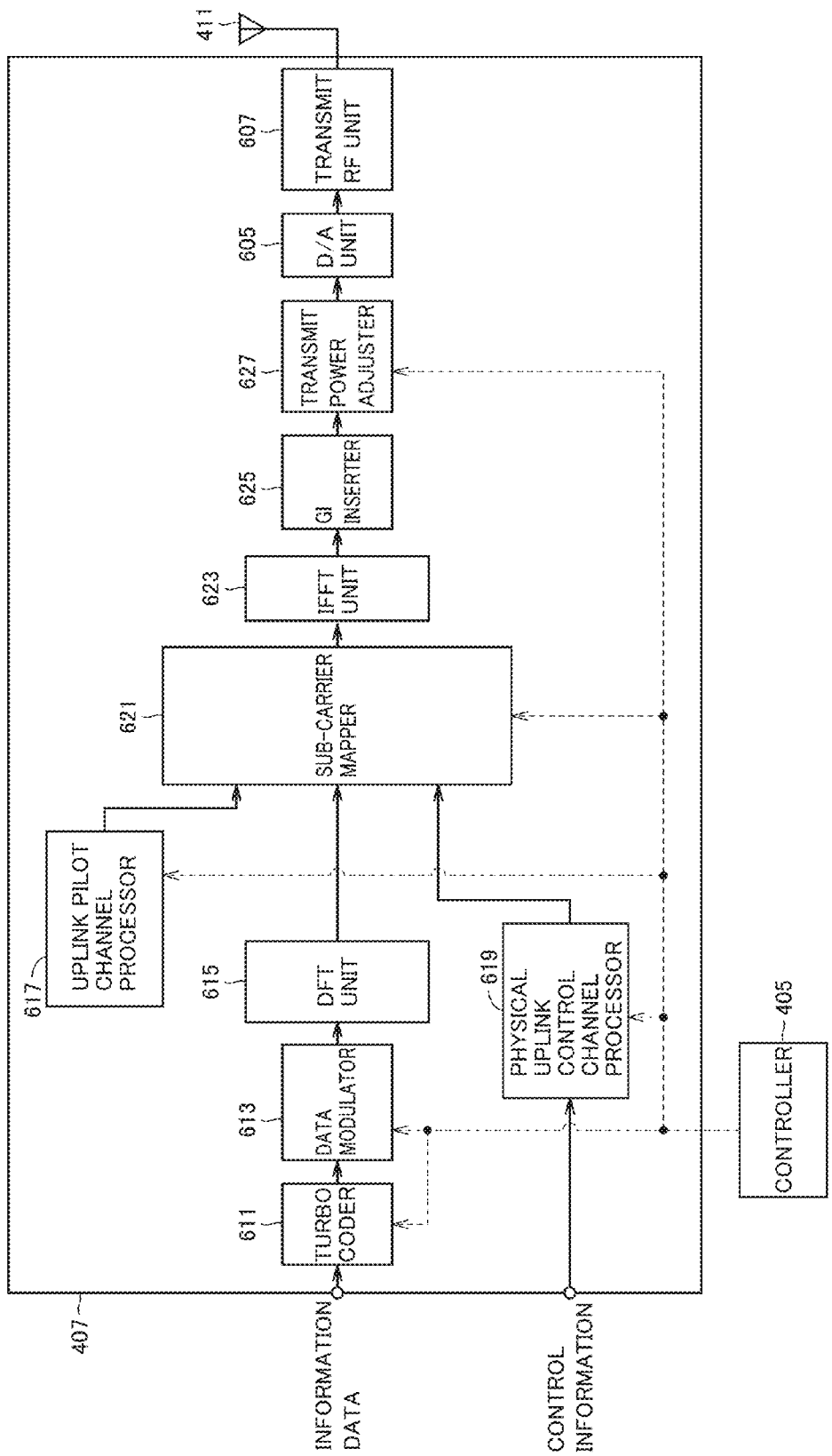
FIG. 6 is a schematic block diagram illustrating a configuration of a transmit processor in a mobile station device according to an embodiment of the present invention.

FIG. 6 is a schematic block diagram illustrating a configuration of a transmit processor 407 in a mobile station device 5 according to an embodiment of the present invention. As illustrated in the drawing, the transmit processor 407 is configured to include a turbo coder 611, a data modulator 613, a DFT unit 615, an uplink pilot channel processor 617, a physical uplink control channel processor 619, a sub-carrier mapper 621, an IFFT unit 623, a GI inserter 625, a transmit power adjuster 627, a D/A unit 605, a transmit RF unit 607, and a transmit antenna 411. The transmit processor 407 encodes and modulates information data and UCI, generates a signal to transmit using the PUSCH and PUCCH, and adjusts the transmission power of the PUSCH and PUCCH.

The turbo coder 611 conducts turbo coding according to a specified code rate from the controller 405 on input information data in order to raise the error resistance of the data, and outputs to the data modulator 613. The data modulator 613 modulates encoded data encoded by the turbo coder 611 according to a specified modulation scheme from the controller 405, such as a modulation scheme like QPSK, 16QAM, or 64QAM, for example, and generates a signal sequence of modulation symbols. The data modulator 613 outputs the generated signal sequence of modulation symbols to the DFT unit 615. The DFT unit 615 applies a discrete Fourier transform to the signal output by the data modulator 613, and outputs to the sub-carrier mapper 621.

The physical uplink control channel processor 619 conducts a baseband signal process in order to transmit UCI input from the controller 405. The UCI input into the physical uplink control channel processor 619 is an ACK/NACK, an SR, or CQI. The physical uplink control channel processor 619 conducts a baseband signal process, and outputs a generated signal to the sub-carrier mapper 621. The physical uplink control channel processor 619 generates a signal by encoding UCI information bits.

In addition, the physical uplink control channel processor 619 conducts signal processing related to code-division multiplexing in the frequency domain and/or code-division multiplexing in the time domain on the signal generated from the UCI. The physical uplink control channel processor 619 multiplies by a specified code sequence from the controller 405 in order to realize code-division multiplexing in the frequency domain with respect to a signal generated from ACK/NACK information bits, SR information bits, or CQI information bits. The physical uplink control channel processor 619 multiplies by a specified code sequence from the controller 405 in order to realize code-division multiplexing in the time domain with respect to a signal generated from ACK/NACK information bits or SR information bits.

The uplink pilot channel processor 617 generates an uplink reference signal, which is a signal known to the base station device 3, on the basis of instructions from the controller 405, and outputs to the sub-carrier mapper 621. The sub-carrier mapper 621 places a signal input from the uplink pilot channel processor 617, a signal input from the DFT unit 615, and a signal input from the physical uplink control channel processor 619 into sub-carriers according to instructions from the controller 405, and outputs to the IFFT unit 623.

The IFFT unit 623 applies an inverse fast Fourier transform to a signal output by the sub-carrier mapper 621, and outputs to the GI inserter 625. Herein, the number of points in the IFFT unit 623 is greater than the number of points in the DFT unit 615. By using the DFT unit 615, the sub-carrier mapper 621, and the IFFT unit 623, a mobile station device 5 modulates a signal to be transmitted using the PUSCH in a DFT-Spread OFDM scheme. The GI inserter 625 adds a guard interval to a signal input from the IFFT unit 623, and outputs to the transmit power adjuster 627.

The transmit power adjuster 627 adjusts the transmission power of a signal input from the GI inserter 625 on the basis of a control signal from the controller 405, and outputs to the D/A unit 605. Note that in the transmit power adjuster 627, the average transmission power of the PUSCH, the PUCCH, and the uplink pilot channel is controlled for every uplink sub-frame. The D/A unit 605 converts a baseband digital signal input from the transmit power adjuster 627 into an analog signal, and outputs to the transmit RF unit 607. The transmit RF unit 607 generates in-phase components and quadrature components of an intermediate frequency from an analog signal input from the D/A unit 605, and removes extra frequency components with respect to the intermediate frequency band. Next, the transmit RF unit 607 converts (upconverts) the signal of intermediate frequency into a signal of high frequency, removes extra frequency components, amplifies the power, and transmits to the base station device 3 via the transmit antenna 411.

Figure 7:
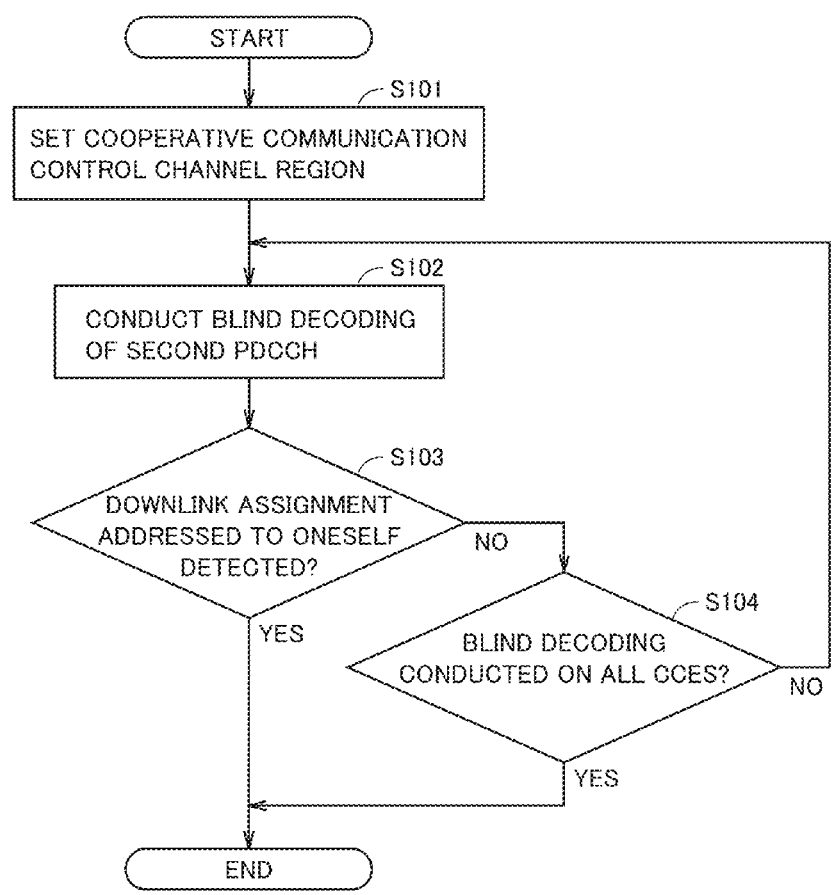
FIG. 7 is a flowchart illustrating an example of a process of detecting a second PDCCH in a mobile station device according to an embodiment of the present invention.

FIG. 7 is a flowchart illustrating an example of a process of detecting the second PDCCH in a mobile station device 5 according to an embodiment of the present invention. The mobile station device 5 sets a cooperative communication control channel region on the basis of information (RRC signaling) received from the base station device 3 (step S101). Specifically, the mobile station device 5 recognizes and sets the structure of CCEs used in the second PDCCH. The structure of REGs used in the CCEs depends on the structure of physical resource blocks used in the cooperative communication control channel region. Next, the mobile station device 5 conducts blind decoding of the second PDCCH with respect to the signal of the CCE (CCEs) in the cooperative communication control channel region (step S102). The mobile station device 5 conducts blind decoding starting from the signal of the CCE with the smallest number in the search space set for the device itself in the cooperative communication control channel region. Next, the mobile station device 5 determines whether or not a downlink assignment addressed to the device itself was detected as a result of the blind decoding (step S103). In the case of determining that a downlink assignment addressed to the device itself was detected (step S103: YES), the mobile station device 5 ends the process of detecting the second PDCCH. In the case of determining that a downlink assignment addressed to the device itself was not detected (step S103: NO), the mobile station device 5 determines whether or not blind decoding has been conducted on all CCEs in the search space of the cooperative communication control channel region (step S104). In the case of determining that blind decoding has been conducted on all CCEs (step S104: YES), the mobile station device 5 ends the process of detecting the second PDCCH. In the case of determining that blind decoding has not been conducted on all CCEs (step S104: NO), the mobile station device 5 returns to step S102, and conducts blind decoding of the second PDCCH with respect to the signal of the CCE with the next number for which blind decoding has not been conducted. Note that the process of detecting the second PDCCH is conducted in units of downlink sub-frames.

Figure 8:
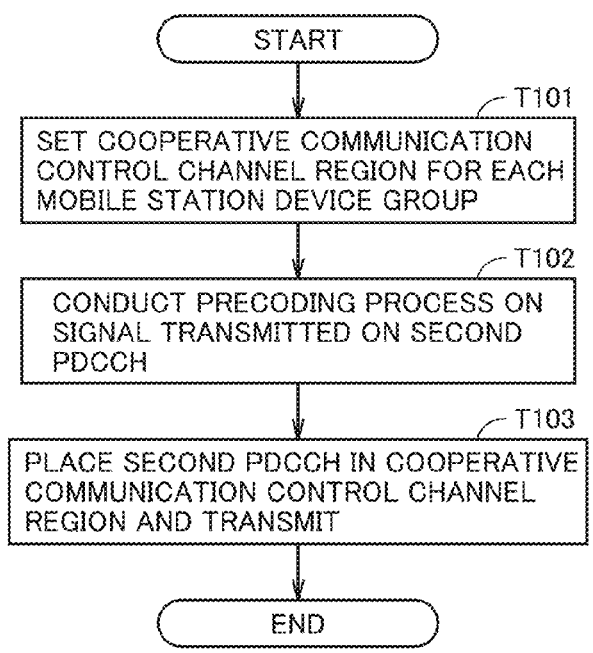
FIG. 8 is a flowchart illustrating an example of a process of transmitting a second PDCCH in a base station device according to an embodiment of the present invention.

FIG. 8 is a flowchart illustrating an example of a process of transmitting the second PDCCH in the base station device 3 according to an embodiment of the present invention. The base station device 3 sets a cooperative communication control channel region for each mobile station device group (step T101). In other words, the base station device 3 sets a cooperative communication control channel region for each RRH 4 that conducts cooperative communication. For example, in FIG. 9, the base station device 3 independently sets cooperative communication control channel regions for each of the RRH 4A, the RRH 4B, and the RRH 4C. The same cooperative communication control channel region is set for multiple mobile station devices 5 belonging to the same RRH 4 (a mobile station device group). For example, in FIG. 9, the mobile station device 5A belonging to the area of the RRH 4A receives the second PDDCH in the cooperative communication control channel region set for the RRH 4A. For example, in FIG. 9, the mobile station device 5B belonging to the area of the RRH 4B receives the second PDDCH in the cooperative communication control channel region set for the RRH 4B. For example, in FIG. 9, the mobile station device SC belonging to the area of the RRH 4C receives the second PDDCH in the cooperative communication control channel region set for the RRH 4C.

Next, the base station device 3 conducts a precoding process on a signal transmitted on the second PDCCH (step T102). Herein, the same precoding process is conducted on signals transmitted on the second PDCCH within the same cooperative communication control channel region. In other words, the base station device 3 conducts a common precoding process related to the second PDCCH for each RRH 4 that conducts cooperative communication. Note that the same precoding process is also conducted on the second reference signal transmitted together with the second PDCCH. Next, the base station device 3 places and transmits the second PDCCH in a cooperative communication control channel region (step T103).

As above, according to an embodiment of the present invention, in a communication system 1, a base station device 3 includes precoding processors (precoding processor 227, precoding processor 231) that conduct the same precoding process on a control channel (second PDCCH) and a reference signal (second reference signal), a base station device controller (controller 105) that sets multiple regions (cooperative communication control channel regions), being an region (cooperative communication control channel region) of resources in which the reference signal (second reference signal) is placed and the control channel (second PDCCH) is potentially placed, for which a common precoding process is used within an region (cooperative communication control channel region), and different precoding processes are used among different regions (cooperative communication control channel regions), and a transmit processor (transmit processor 107) that uses resources in the region (cooperative communication control channel region) to transmit the control channel (second PDCCH) and the reference signal (second reference signal). A mobile station device 5 includes a mobile station device controller (controller 405) that sets an region (cooperative communication control channel region) on the basis of announced information from the base station device 3, a propagation channel estimator (propagation channel estimator 513) that averages estimation values of propagation channel variation estimated from multiple reference signals (second reference signals) within the region (cooperative communication control channel region), and a control channel detector (physical downlink control channel decoder 521) that uses the averaged propagation channel estimation values to conduct a process of detecting a control channel (second PDCCH) that includes control information (DCI) addressed to the device itself. In addition, the base station device controller (controller 105) sets different regions (cooperative communication control channel regions) per a device (RRH 4) that includes a radio unit that conducts cooperative communication together with the base station device itself.

As above, according to an embodiment of the present invention, the base station device 3, by setting a cooperative communication control channel region for every RRH 4 that conducts cooperative communication, is able to transmit by conducting a precoding process (beamforming process) suited to each RRH 4 on the second PDCCH and the second reference signal, while respective mobile station devices 5 belonging to the area of each RRH 4 are able to receive a control signal via a transmission channel with superior transmission characteristics. Furthermore, the base station device 3 applies the same precoding process to the second PDCCH and the second reference signal within the same cooperative communication control channel region, while a mobile station device 5 conducts an averaging process on propagation channel estimation values estimated from multiple second reference signals within the cooperative communication control channel region. For this reason, it is possible to reduce the effects of noise on the propagation channel estimation values, and more suitably demodulate a control signal transmitted using cooperative communication (a signal transmitted on the second PDCCH).

Note that in an embodiment of the present invention, an region of resources in which the second PDCCH is potentially placed is defined as a cooperative communication control channel region for the sake of simplicity, but it should be clear that the present invention is still applicable even if defined using different language, insofar as the meaning is similar.

Also, in an embodiment of the present invention, a communication system in which a base station device and RRHs conduct cooperative communication is illustrated, but the present invention is also applicable to a communication system to which multi-user MIMO (MU-MIMO) is applied within a single base station device. For example, MU-MIMO uses precoding technology or the like to control beams with respect to signals for each of multiple mobile station devices existing at different positions (area A and area B, for example) within the area of a base station device that uses multiple transmit antennas. As a result, MU-MIMO is a technology that maintains mutual orthogonality, or reduces co-channel interference, with respect to mobile station device signals, even in the case of using the same resources in the frequency domain and the time domain. Since mobile station device signals are spatially multiplexed and demultiplexed, MU-MIMO is also designated space-division multiple access (SDMA).

With MU-MIMO, different precoding processes are applied to respective, spatially-multiplexed mobile station devices. Within the area of a base station device, different precoding processes are conducted on the second PDCCH and the second reference signal of a mobile station device positioned in the area A and a mobile station device positioned in the area B. Areas in which the second PDCCH is potentially placed are independently set for a mobile station device positioned in the area A and a mobile station device positioned in the area B, and precoding processes are independently applied.

In addition, a mobile station device 5 is not limited to being equipment that moves, and the present invention may also be realized by implementing the functions of a mobile station device 5 in stationary equipment or the like.

The characteristics means of the present invention described above may also be realized by implementing and controlling functions in an integrated circuit.

In other words, an integrated circuit according to the present embodiment, by being implemented in a mobile station device 5, causes the mobile station device 5 to exhibit multiple functions. This integrated circuit causes the mobile station device 5 to exhibit a series of functions, including a function of communicating with a base station device 3 and receiving from the base station device 3 a control channel and a reference signal that have been subjected to the same precoding process, a function of setting an region of resources in which the reference signal is placed and the control channel is potentially placed, a function of averaging propagation channel variation estimation values estimated from multiple reference signals within the region, and a function of conducting a process of using the averaged propagation channel estimation values to detect a control channel that includes control information addressed to the mobile station device itself.

In addition, an integrated circuit according to the present embodiment, by being implemented in the base station device 3, causes the base station device 3 to exhibit multiple functions. This integrated circuit causes the base station device 3 to exhibit a series of functions, including a function of communicating with multiple mobile station devices 5, a function of conducting the same precoding process on a control channel and a reference signal, a function of setting multiple regions, being an region of resources in which the reference signal is placed and the control channel is potentially placed, for which a common precoding process is used within an region, and different precoding processes are used among different regions, and a function of using resources in the region to transmit the control channel and the reference signal.

Operations in accordance with an embodiment of the present invention may also be realized with a program. A program operating on a mobile station device 5 and a base station device 3 according to the present invention is a program that controls a CPU or the like (a program that causes a computer to function) so as to realize the functions of the above embodiment. Additionally, information handled by these devices is temporarily buffered in RAM during the processing thereof, and thereafter stored in various types of ROM or an HDD, and read out, and modified/written by the CPU as necessary. A recording medium that stores the program may be any of a semiconductor medium (such as ROM or a non-volatile memory card, for example), an optical recording medium (such as a DVD, MO, MD, CD, or BD, for example), or a magnetic recording medium (such as magnetic tape or a flexible disk, for example). Also, rather than the functions of the embodiment discussed above being realized by executed a loaded program, in some cases the functions of the present invention may be realized by joint processing with an operating system, another application program, or the like.

Also, in the case of distribution into the market, the program may be distributed by being stored on a portable recording medium, or by being transferred to a server computer connected via a network such as the Internet. In this case, a storage device of the server computer is also included in the scope of the present invention. In addition, all or part of a mobile station device 5 and the base station device 3 in the foregoing embodiment may also be realized as LSI, typically an integrated circuit. The various function blocks of a mobile station device 5 and the base station device 3 may be realized as individual chips, or all or part thereof may be integrated as a single chip. Furthermore, the circuit integration methodology is not limited to LSI and may be also be realized with special-purpose circuits, or with general-purpose processors. In addition, if progress in semiconductor technology yields integrated circuit technology that may substitute for LSI, an integrated circuit according to that technology may also be used.

The foregoing thus describes an embodiment of the present invention in detail and with reference to the drawings. However, specific configurations are not limited to this embodiment, and designs or the like within a scope that does not depart from the principles of the present invention are to be included in the scope of the claims.

REFERENCE SIGNS LIST 1 communication system
3 base station device
4, 4A, 4B, 4C RRH
5 mobile station device
101, 401 receive processor
103, 403 radio resource controller
105, 405 controller
107, 407 transmit processor
109, 409 receive antenna
111, 411 transmit antenna
201 physical downlink shared channel processor
203 physical downlink control channel processor
205 downlink pilot channel processor
207 multiplexer
209 IFFT unit
211 GI inserter
213 D/A unit
219, 611 turbo coder
221, 613 data modulator
223 convolutional coder
225 QPSK modulator
227, 229, 231 precoding processor
301, 501 receive RF unit
303 A/D unit
309, 505 symbol timing detector
311, 507 GI remover
313, 509 FFT unit
315 sub-carrier demapper
317, 513 propagation channel estimator
319, 321 propagation channel equalizer
325, 523 data demodulator
327, 525 turbo decoder
329 physical uplink control channel detector
511 demultiplexer
515, 519 propagation channel compensator
517 physical downlink shared channel decoder
521 physical downlink control channel decoder
527 QPSK demodulator
529 Viterbi decoder
617 uplink pilot channel processor
619 physical uplink control channel processor
621 sub-carrier mapper
627 transmit power adjuster

The invention claimed is:

1. A base station apparatus configured to communicate with a terminal apparatus, the base station apparatus comprising:
a controller configured to configure, by using a higher layer signaling, a first control channel region and a second control channel region being different from the first control channel region, the first control channel region including a plurality of resource block pairs, and the second control channel region including a plurality of resource block pairs; and
a physical downlink control channel processor configured to transmit a second physical downlink control channel which is different from a first physical downlink control channel, using one or a plurality of control channel elements, wherein
the one or the plurality of control channel elements is included in a set of control channel elements that constitute either the first control channel region or the second control channel region,
the physical resource block pairs included in the first control channel region are indicated by the higher layer signaling,
the physical resource block pairs included in the second control channel region are indicated by the higher layer signaling,
a transmission process is applied to the first control channel region and the second control channel region independently,
each of the one or the plurality of control elements consists of a plurality of resource element groups, and
each of the plurality of resource element groups is constituted of resource elements which are in a resource block pair and which do not carry a demodulation reference signal associated with the second physical downlink control channel.

2. The base station apparatus according to claim 1, wherein
the demodulation reference signal is transmitted only on a physical resource block pair upon which the second physical downlink control channel is mapped.

3. The base station apparatus according to claim 1, wherein
a number of control channel elements in the set of control channel elements is determined on the basis of at least a number of resource block pairs that constitute the corresponding first or second control channel region.

4. The base station apparatus according to claim 1, wherein
the physical downlink control channel processor is further configured to transmit the first physical downlink control channel and the second physical downlink control channel in a same subframe.

5. A terminal apparatus configured to communicate with a base station apparatus, the terminal apparatus comprising:
a controller configured to configure, on the basis of a higher layer signaling, one of a first control channel region and a second control channel region being different from the first control channel region, the first control channel region including a plurality of resource block pairs, and the second control channel region including a plurality of resource block pairs; and
a physical downlink control channel processor configured to monitor a physical downlink control channel, wherein
the physical downlink control channel is transmitted using one or a plurality of control channel elements,
the one or the plurality of control channel elements is included in a set of control channel elements that constitute either the first control channel region or the second control channel region,
the physical resource block pairs included in the one of the first control channel region and the second control channel region are indicated by the higher layer signaling,
the physical downlink control channel processor is further configured to perform propagation channel estimation for the monitoring of the physical downlink control channel assuming that a same precoding is used across the plurality of physical resource block pairs included in the one of the first control channel region and the second control channel region,
each of the one or the plurality of control elements consists of a plurality of resource element groups and
each of the plurality of resource element groups is constituted of resource elements which are in a resource block pair and which do not carry a demodulation reference signal associated with the second physical downlink control channel.

6. The terminal apparatus according to claim 5, wherein
the demodulation reference signal is transmitted only on a physical resource block pair upon which the second physical downlink control channel is mapped.

7. The terminal apparatus according to claim 5, wherein
a number of control channel elements in the set of control channel elements is determined on the basis of at least a number of resource block pairs that constitute the corresponding first or second control channel region.

8. A communication method of a base station apparatus which is configured to communicate with a terminal apparatus, the communication method comprising:
configuring, by using a higher layer signaling, a first control channel region and a second control channel region different from the first control channel region, the first control channel region including a plurality of resource block pairs, and the second control channel region including a plurality of resource block pairs; and
transmitting a second physical downlink control channel which is different from a first physical downlink control channel, using one or a plurality of control channel elements, wherein
the one or the plurality of control channel elements is included in a set of control channel elements that constitute either the first control channel region or the second control channel region,
the physical resource block pairs included in the first control channel region are indicated by the higher layer signaling,
the physical resource block pairs included in the second control channel region are indicated by the higher layer signaling,
a transmission process is applied to the first control channel region and the second control channel region independently,
each of the one or the plurality of control elements consists of a plurality of resource element groups and
each of the plurality of resource element groups is constituted of resource elements which are in a resource block pair and which do not carry a demodulation reference signal associated with the second physical downlink control channel.

9. A communication method of a terminal apparatus configured to communicate with a base station apparatus, the communication method comprising:

configuring, on the basis of a higher layer signaling, one of a first control channel region and a second control channel region, the first control channel region including a plurality of resource block pairs, and the second control channel region including a plurality a resource block pairs; and monitoring a physical downlink control channel, wherein the physical downlink control channel is transmitted using one or a plurality of control channel elements, the one or the plurality of control channel elements is included in a set of control channel elements that constitute either the first control channel region or the second control channel region, the physical resource block pairs included in the one of the first control channel region and the second control channel region are indicated by the higher layer signaling, the monitoring of the physical downlink control channel includes performing propagation channel estimation assuming that a same precoding being used across the plurality of physical resource block pairs included in the one of the first control channel region and the second control channel region, each of the one or the plurality of control elements consists of a plurality of resource element groups and each of the plurality of resource element groups is constituted of resource elements which are in a resource block pair and which do not carry a demodulation reference signal associated with the second physical downlink control channel.

* * * * *